(12) United States Patent
Shaikli

(10) Patent No.: US 8,437,369 B2
(45) Date of Patent: May 7, 2013

(54) PACKETS TRANSFER DEVICE THAT INTELLIGENTLY ACCOUNTS FOR VARIABLE EGRESS CHANNEL WIDTHS WHEN SCHEDULING USE OF DISPATCH BUS BY EGRESSING PACKET STREAMS

(75) Inventor: Nadim Shaikli, San Diego, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1828 days.

(21) Appl. No.: 11/437,082

(22) Filed: May 19, 2006

(65) Prior Publication Data

US 2007/0268931 A1 Nov. 22, 2007

(51) Int. Cl.
*H04J 3/00* (2006.01)
(52) U.S. Cl.
USPC .......................................... 370/468; 370/412

(58) Field of Classification Search .................. 370/316, 370/468
See application file for complete search history.

(56) References Cited

U.S. PATENT DOCUMENTS

| | | | | |
|---|---|---|---|---|
| 6,738,371 | B1* | 5/2004 | Ayres | 370/352 |
| 6,850,490 | B1* | 2/2005 | Woo et al. | 370/230 |
| 2006/0088046 | A1* | 4/2006 | Wong et al. | 370/413 |
| 2006/0109789 | A1* | 5/2006 | Skerritt | 370/238 |

\* cited by examiner

*Primary Examiner* — Mark Rinehart
*Assistant Examiner* — Matthew Hopkins
(74) *Attorney, Agent, or Firm* — Tracy Parris

(57) ABSTRACT

In PCI-Express and alike communications systems, data bandwidth per channel can vary as a result of negotiated port aggregation and/or bifurcation during network bring-up. Disclosed are systems and methods for opportunistically interleaving dispatches of packet data for secondary egress channels when the data bandwidth of a primary egress channel is relatively small and thus creates slack on a dispatch bus between dispatches of primary data blocks.

17 Claims, 7 Drawing Sheets

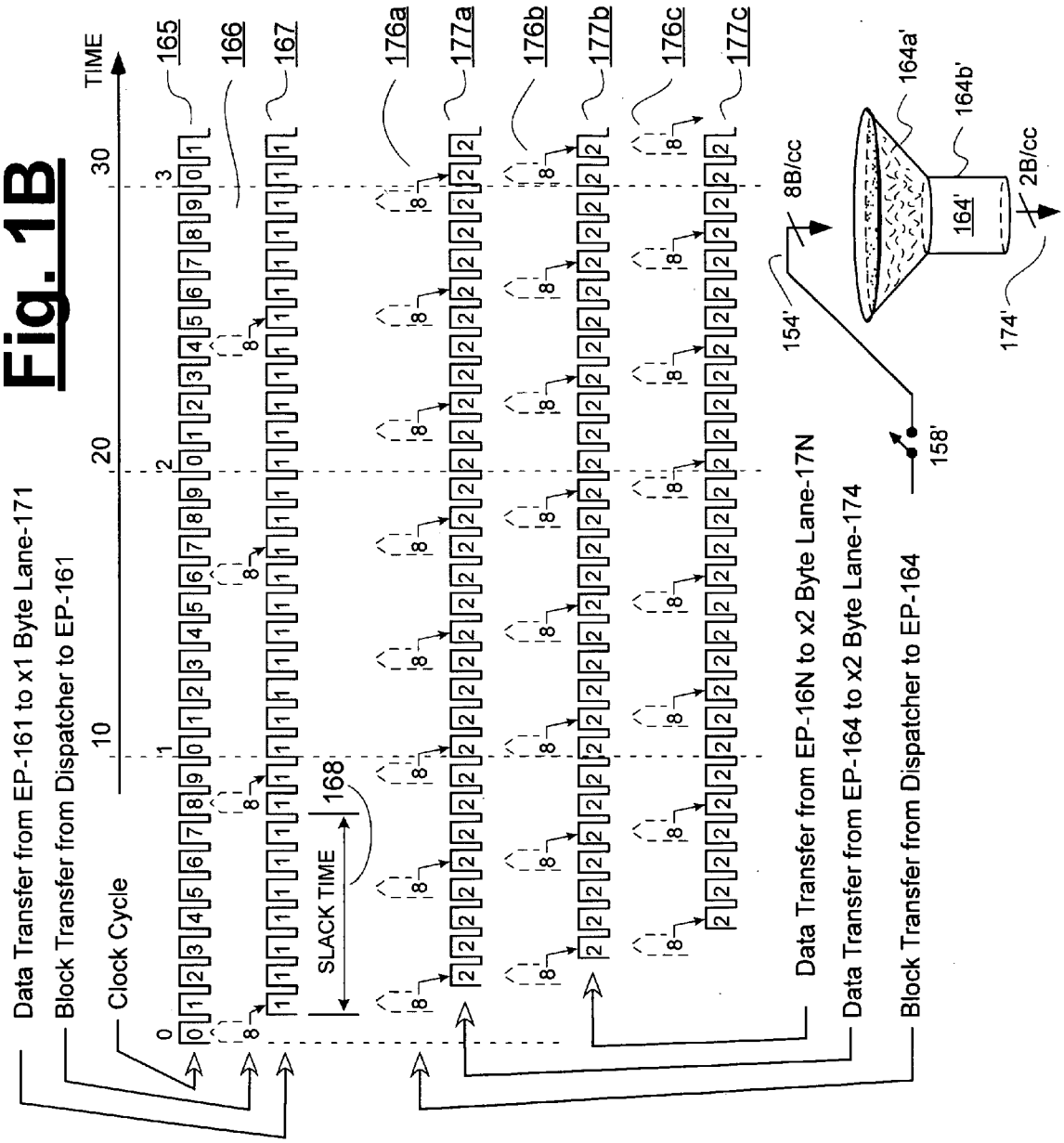

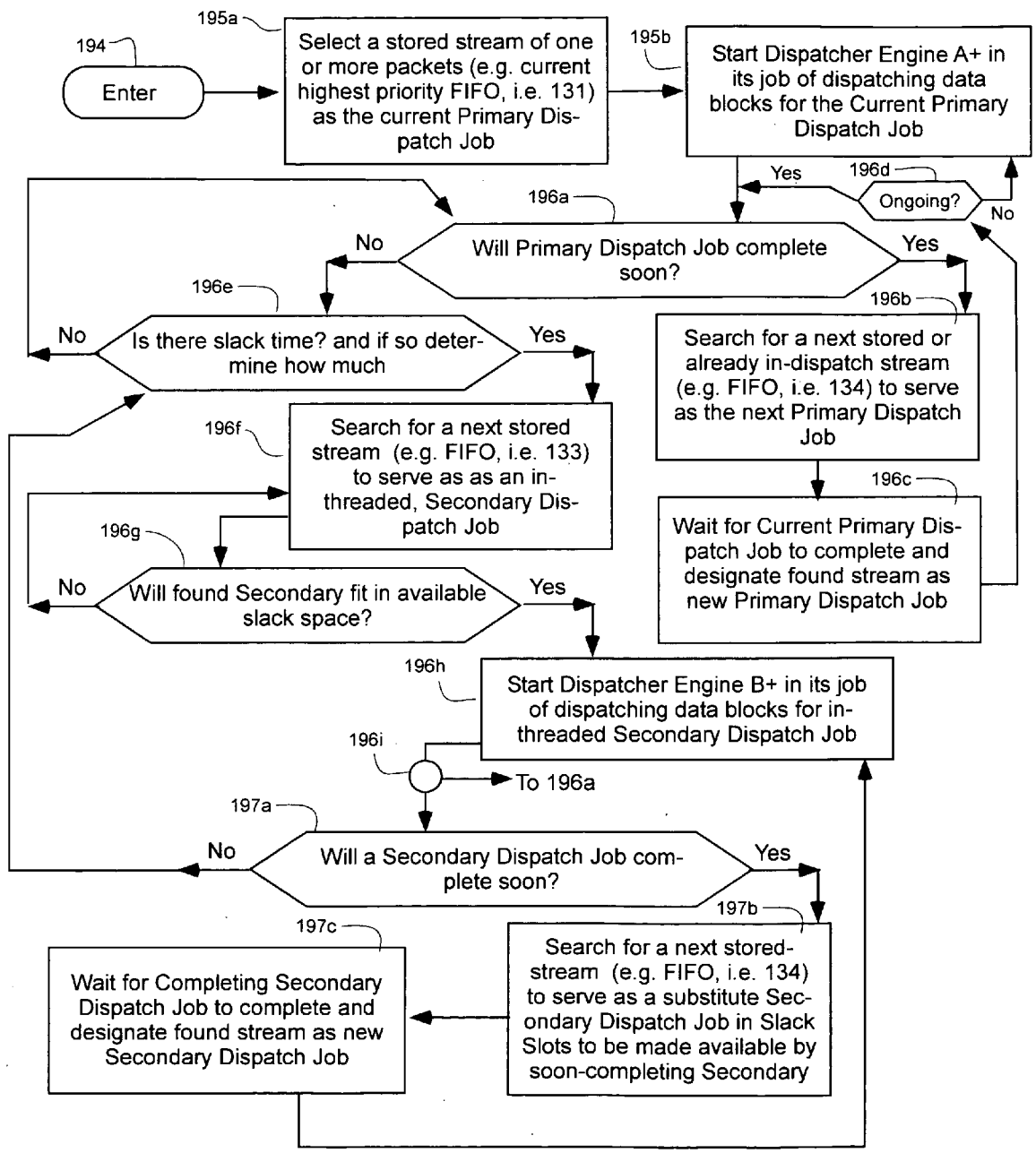

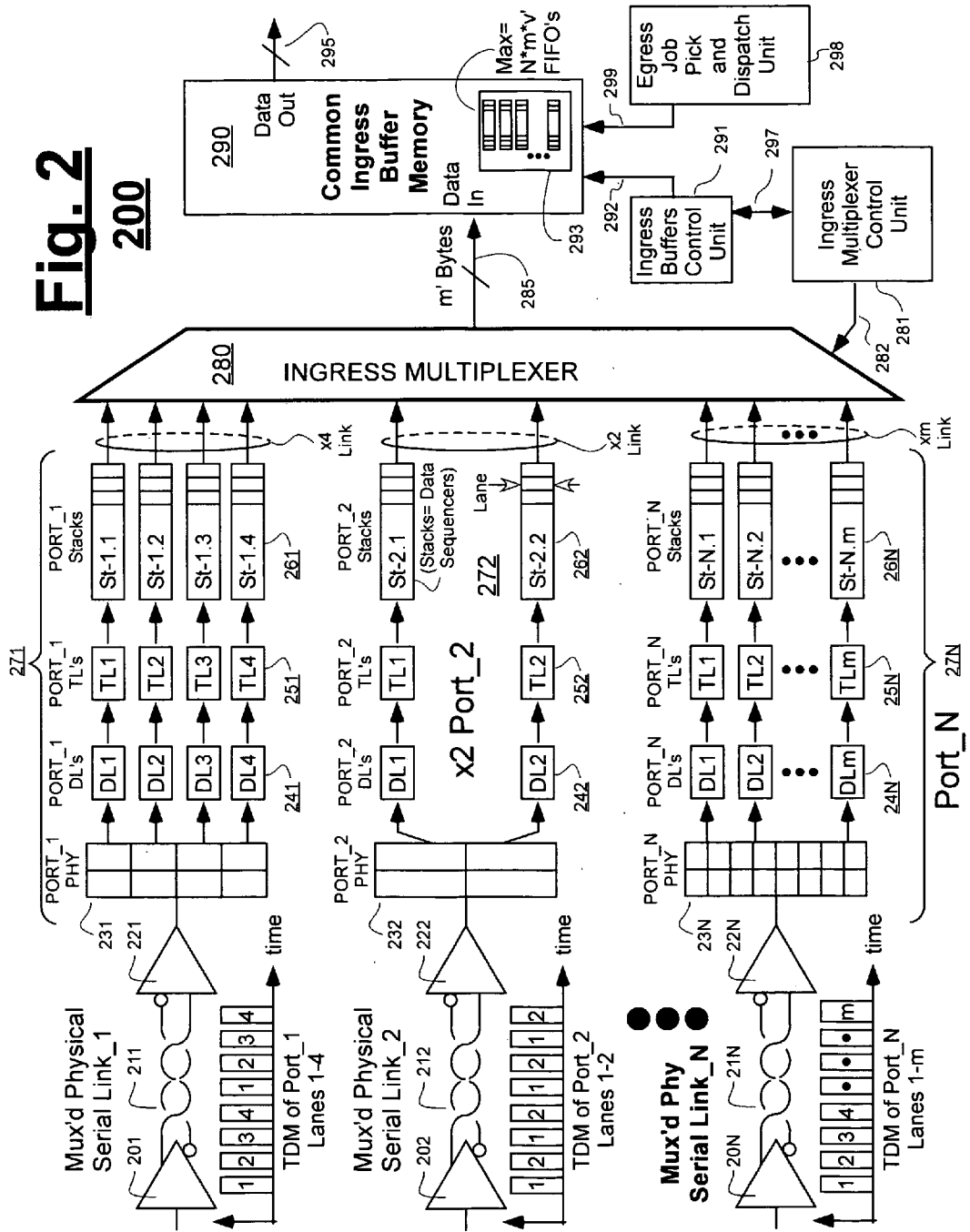

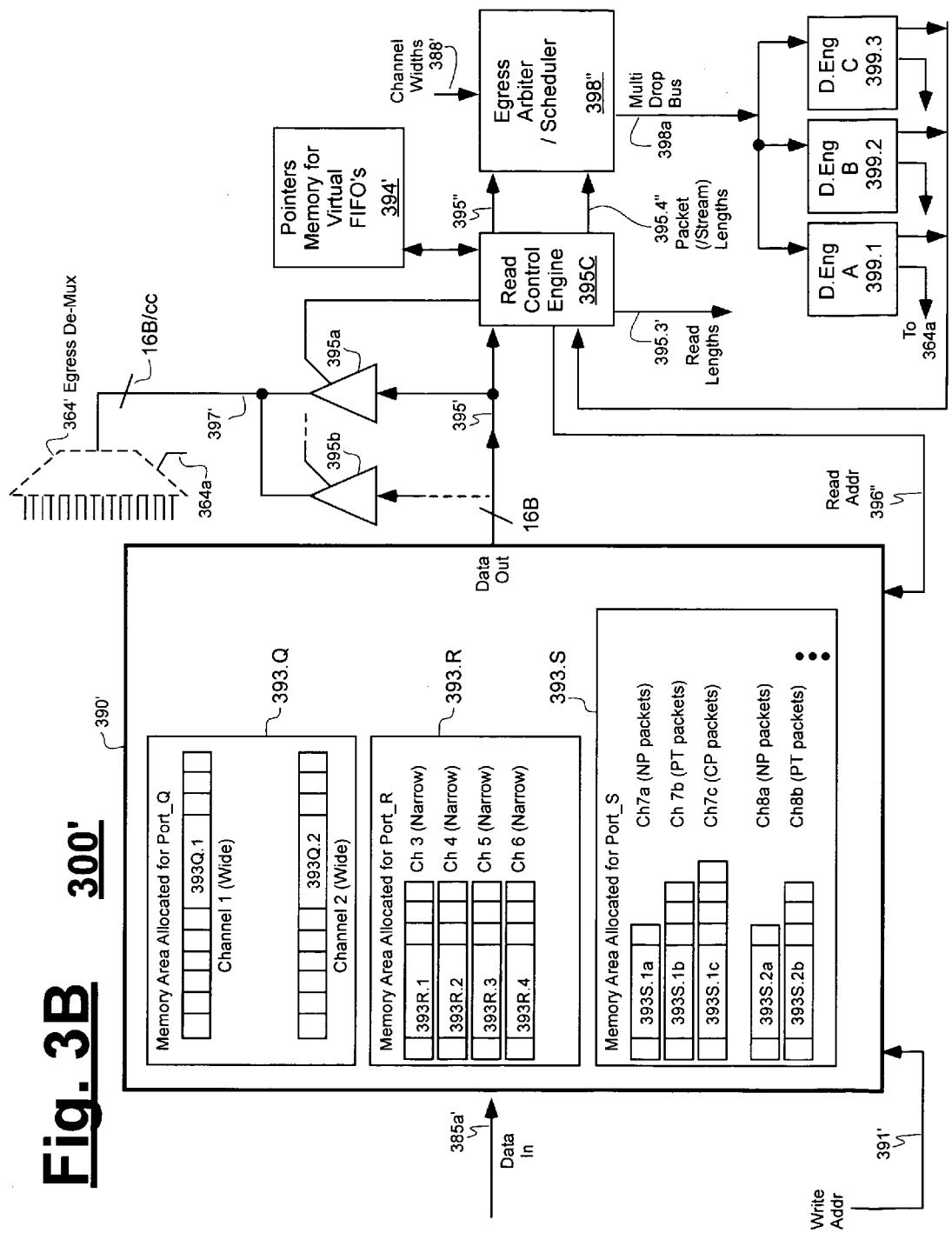

PACKETS TRANSFER DEVICE THAT INTELLIGENTLY ACCOUNTS FOR VARIABLE EGRESS CHANNEL WIDTHS WHEN SCHEDULING USE OF DISPATCH BUS BY EGRESSING PACKET STREAMS

CROSS REFERENCE TO CO-OWNED APPLICATION

The following copending U.S. patent application is owned by the owner of the present application, and its disclosure is incorporated herein by reference:

(A) Ser. No. 11/390,754 filed Mar. 28, 2006 by Nadim Shaikli and originally entitled, "Packets Transfer Device Having Data Absorbing Buffers with Elastic Buffer Capacities".

FIELD OF DISCLOSURE

The present disclosure of invention relates generally to telecommunication systems that transmit information in packet format. The disclosure relates more specifically to systems that can employ ingress and egress flow rates of differing values for different communication channels.

DESCRIPTION OF RELATED ART

The use of digitally-encoded packets in telecommunication systems is well known. Typically each packet is layered like an onion to have header-type outer shell sections, a payload core section and one or more error correction sections that cover various parts of the core or outer shells. Packets may be transmitted individually or as parts of relatively continuous streams or bursts depending on quality of service requirements and/or availability of transmission links. When packet signals are transmitted from a source device to a receiving device, the packet signals that arrive at the receiving device typically progress through a physical interface layer (PHY), and then through one or both of a data link layer (DL) and a transaction layer (TL). The physical interface layer (PHY) may include means for serializing and deserializing data (SERDES). The data link layer (DL) may include means for managing error checking and error correction (e.g., ECC, CRC). The transaction layer (TL) may include means for parsing (peeling the onion skin layers of) different parts of each kind of packet so as to get to desired portions of the payload data. Payload data from sequentially ingressing packets may sometimes need to be reordered for purposes of reconstructing an original data sequence different from the ingress sequence, where the original data sequence may, for example, be required for reconstituting a rasterized graphic image. Packet signals leaving a source device typically progress in the reverse order, namely, first by moving outgoing payload data through the transaction layer (TL), then through the data link layer (DL) and finally through the sender's physical interface layer (PHY) for output onto a physical transmission media (e.g., a high frequency cable or printed circuit strip).

Packet data that is ingressing into a receiving device typically gets routed to a parallel set of buffers (e.g., First-In, First-Out buffers) before being further processed and then being output via one or more egress channels. The buffers act somewhat like shock absorbers in that each absorbs and smoothes out the often-bursty nature of ingressing data streams on each respective data channel and then stores the data until it is ready to be processed and egressed. A conventional paradigm configures all the ingress receiving buffers of a communications device to be of the same depth and width. A conventional paradigm does not account for the possibility of variable bandwidths on the ingress and/or egress channels. In other words, all the ingress buffers of a conventional approach have a same data length per stored word (number of bits per word) and a same number of storage locations between ends (a same depth for each of the plural buffers) irrespective of channel bandwidth. Also, conventional egress processing assumes that all egress channels have roughly the same output rate and all egressing packet blocks or streams enter and fill those channels as relatively smooth and continuous flows rather than as sporadic bursts.

Recently, a number of communication protocols have started gaining favor wherein programmably or dynamically variable data rates are supported for plural channels. Included among these emerging protocols are the PCI-Express™ protocol and the HyperTransport™ protocol. These relatively new, industry standardized protocols allow different logical channels to each have a different, programmably-established or dynamically-defined channel configuration, including a different maximum data rate. For example, one logically-configured communication channel may be programmably or dynamically formed as an aggregation of many, relatively slow sub-channel resources (i.e., PCI-Express lanes) while another logically-configured channel may be variably formed to have one or just a few, such slow or basic sub-channel resources (i.e., lanes). The data bandwidth of the channel containing a greater number of basic sub-channel resources will generally be larger than the data bandwidth of the channel having just one or few sub-channel resources aggregated together. A trade off is made between number of sub-channel resources consumed per communication channel and the bandwidth of each such channel. In the realm of PCI-Express™, the aggregated variable bandwidth channel resources are sometimes referred to as logical "ports" or "links" and the lowest common speed, sub-channel resource at the physical layer level is often referred to as a "lane". Lanes may be selectively aggregated together to define higher speed ports in PCI-Express systems. Ports may be selectively bifurcated to define larger numbers of virtual channels per port albeit with lower bandwidths per channel.

When a PCI-Express™ network is being adaptively configured or re-configured during network bring-up or reboot, the associated software determines how many lanes (sub-channel resources) to assign to each PCI-Express™ "port" or PCIe logical "link" (the terms PCIe port and PCIe link are sometimes used interchangeably) so as to thereby define the maximum data rate supported by that port. For example, a first PCIe port may be programmably configured (during network boot-up) to consist of an aggregation of 8 basic hardware lanes with a lowest common bandwidth per lane of 2.5 Gb/s (Giga-bits per second) thus giving the x8 first Port an aggregated bandwidth of 20 Gb/s. That first port can support a corresponding single channel of 20 Gb/s bandwidth or multiple virtual channels with lower bandwidths that can add up to as much as 20 Gb/s. At the same time, a second PCIe port can be programmably configured during the same network boot-up to consist of an aggregation of just 4 basic lanes, thus giving that x4 second Port an aggregated bandwidth of 10 Gb/s. A third PCIe port can be programmably configured during the same network boot-up to consist of just one lane; thus giving that x1 Port a bandwidth of just 2.5 Gb/s. In a subsequent boot-up, the first through third ports may be reconfigured differently due to flexible resource negotiations that can take place during each network reconfiguration.

In a PCIe system, it is possible for a multi-ported switching device to have one of its ports logically configured after bring-up as an aggregation of 2 basic lanes (thus giving the x2 Port a 5.0 Gb/s bandwidth) and another of its ports configured as one lane (a 2.5 Gb/s bandwidth for that communications port) due to adaptive link negotiations that take place during network bring-up. However, despite the possibly different bandwidths that might be dynamically or programmably assigned to each of its ports (or virtual channels), the conventional switching device will typically have a central or main set of ingress-receiving FIFO's with each FIFO having a same, constant data width and same, constant FIFO depth. This conventional paradigm can create inefficiencies as will be explained in greater detail below. Moreover, conventional management of egressing packet traffic assumes that all egress channels are of substantially same bandwidth and all egressing packets are egressing out on a roughly smooth basis through their respective egress channels. This too can create inefficiencies as will become clearer from the below detailed description.

SUMMARY

Structures and methods may be provided in accordance with the present disclosure of invention for improving over the above-described, conventional design approaches.

A packets transfer device in accordance with the present disclosure includes a dispatch bus of finite bandwidth over which egress-packet data is dispatched to plural egress channels of potentially different bandwidths, including to egress channels with bandwidths less than that of the dispatch bus. A scheduler detects situations where the dispatch bus may exhibit bandwidth slack due to smaller bandwidth of a primary dispatch job. The scheduler tests to see if there are secondary dispatch jobs of sufficiently small bandwidth to fill the slack and thereby reduce or minimize slack time on the dispatch bus. More specifically, in one embodiment, the scheduler determines how long it will take for a to-be-dispatched wide block of packet data (say a 16 Byte wide block) to finish egressing out through its relatively narrow destination channel (first channel) given that the current bandwidth (say 1B per clock cycle) of that first egress channel may require a next K clock cycles (say K=16) for trickling out the data of that first data block through the primary-job destination channel. Given the slack time that may be present on the dispatch bus until a next wide block of primary job data can be dispatched to the primary-job egress channel (e.g., to the 1B/cc thin pipe that will consume K=16 clock cycles), the dispatcher determines whether there is a secondary dispatch job that can be simultaneously dispatched over the dispatch bus in the available slack time on behalf of a secondary dispatch job that is to have its packet or packets dispatched to a different, second egress channel (e.g., a 2B/cc channel). If there is, the scheduler interlaces or threads-in the dispatching operations of the secondary job with the dispatching operations of the primary job so as to thereby make use of the slack bandwidth represented by the slack time found to be present in the primary job.

A packets transfer device in accordance with the present disclosure may be additionally configured to have data buffering FIFO's with programmably variable (elastic) FIFO depths for each of programmably re-configurable ports or communication channels so that FIFO depth may be efficiently tailored to match the bandwidth needs of differently configured ingress and/or egress channels.

A machine-implemented method is provided in accordance with the disclosure for more efficiently utilizing packet dispatch resources by testing to see if a currently-being-serviced, first egress channel (primary dispatch job) will be kept busy processing a recently-dispatched, first block of packet data (e.g., an 16B block) for a sufficiently long time such that slack time is available on a commonly-used dispatch bus for dispatching a second block of packet data to a second egress channel (secondary dispatch job) if that second egress channel is ready to absorb the second packet block during the slack time of the primary job, and if so, dispatching the second packet block to the second egress channel in the slack time. In one embodiment, when a primary dispatch job completes, another of the dispatch jobs then proceeding over the dispatch bus (e.g., a long dispatch stream) is designated as the new primary dispatch job whose slack time will be filled by dispatches for secondary dispatch jobs that can opportunistically fir into that slack time. In one embodiment, the method is carried out for variable bandwidth egress channels of a PCI-Express system.

Other aspects of the disclosure will become apparent from the below detailed description.

BRIEF DESCRIPTION OF THE DRAWINGS

The below detailed description section makes reference to the accompanying drawings, in which:

FIG. 1B is a flow chart of an opportunistic dispatch process in accordance with the disclosure;

FIG. 1D is a flow chart of a packet length sensitive algorithm in accordance with the disclosure;

FIG. 2 is a block diagram of a packet receiving system having programmably configurable ports feeding into a common ingress buffer memory;

FIG. 3B is a schematic diagram providing a more detailed look at one embodiment in accordance with FIG. 3A.

DETAILED DESCRIPTION

Figure 1A:
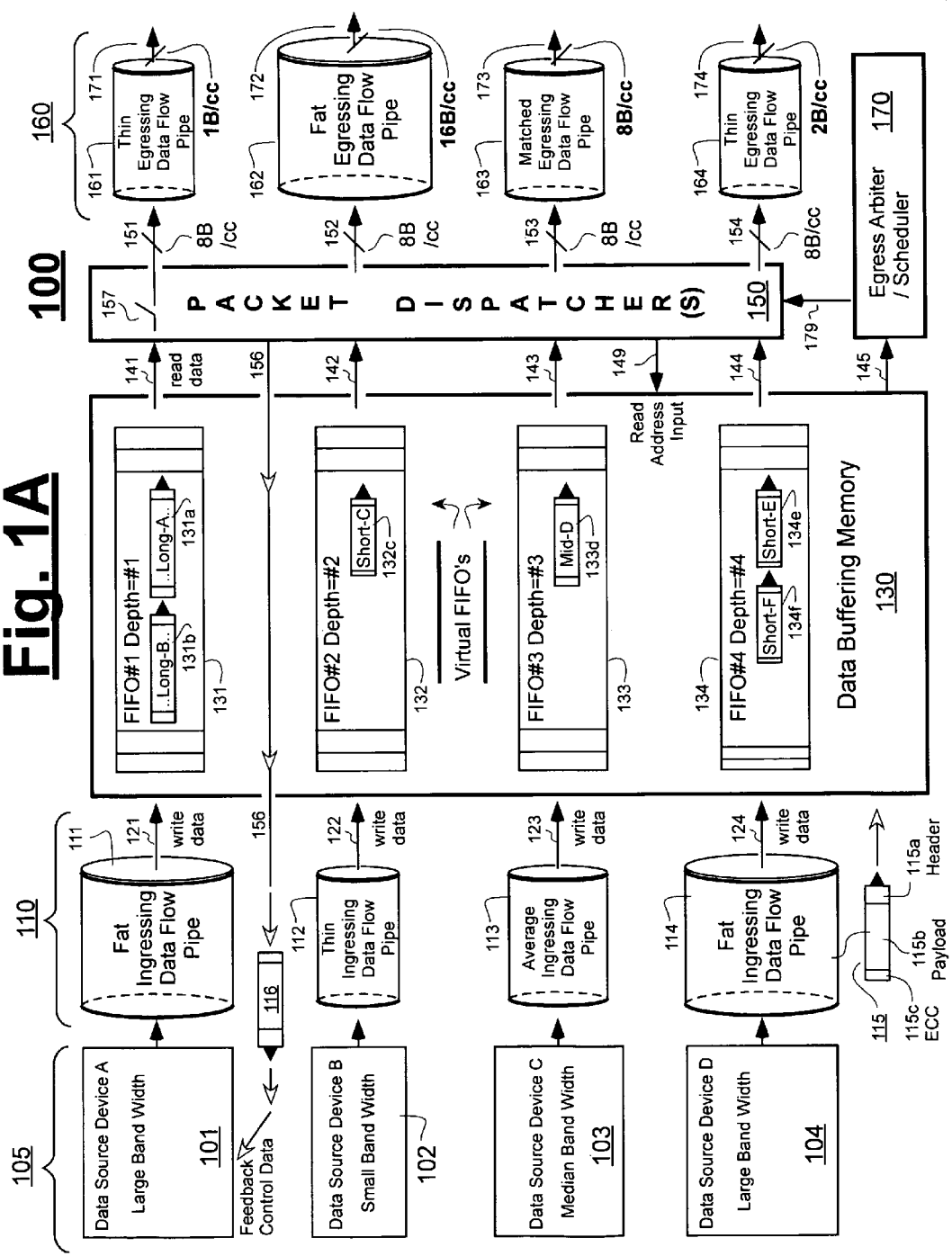
FIG. 1A is a block diagram of a packet switching system having channel-servicing FIFO's for storing pre- or post-process packets that are about to be dispatched to egress channels of differing bandwidths.

Referring to a hypothetical first telecommunication system 100 that is schematically illustrated in FIG. 1A, seen under column 105 are first through fourth data source devices, 101-104. Data source device "A" (101) is taken to have a relatively large data output bandwidth—at least for the moment—while device "B" (102) has a relatively small bandwidth and device "C" (103) has a median bandwidth. Device "D" (104) of the example is shown to have a relatively large bandwidth, like that of device "A", although it could have instead been programmably or fixedly configured to have an output bandwidth value almost anywhere in the allowable spectrum of the system between what may be considered a very small bandwidth (system minimum) and very large bandwidth (system maximum). Specific bandwidth values may vary from application to application, or time to time. FIG. 1A is provided mostly for purpose of generically illustrating certain problems associated with telecommunication systems that employ data sources or data pipes of different bandwidths but data-absorbing buffers of constant and same depths; and data dispatchers that do not opportunistically adapt to variations in egress bandwidths and/or variations in lengths of egressing packet streams.

Represented under column 110 are aggregations of the physical transmission media and logical transmission pipes 111-114 which respectively conduct signals from the respective data source devices 101-104 to an ingressing-data side (data receiving side) of a data buffering memory area 130. In practice the physical transmission media and/or logical data transfer pipes 111-114 will generally not have differing appearances and each may appear simply as a single coaxial cable or a single optical fiber or a high frequency transmission strip on a printed circuit board coupled to a physical media interface circuit followed by SERDES circuitry (serializing and de-serializing circuitry). In one embodiment, all the illustrated pipes 111-114 can be multiplexed over a single, bidirectional optical transmission line prior to being demultiplexed and de-serialized into parallel electrical signal flows. In order to graphically illustrate certain aspects, however, the transmission media/pipes 111-114 (which can be bidirectional media/pipes) are schematically shown as being separate wide, narrow or medium width data pipes. Width indicates bandwidth in this schematic representation. Transmission pipe 111 is shown to be a relatively "fat" data flow pipe which means that pipe 111 can handle the large output bandwidth of device "A" (101). In contrast, transmission pipe 112 is shown as a comparatively thinner data flow pipe which means that pipe 112 handles no more than the smaller output bandwidth of device "B" (102). Similarly, transmission pipe 113 is shown as an average width data flow pipe that is configured to handle the median output bandwidth of device "C" (103). The fourth pipe 114 is shown as a fat data flow pipe to match the large bandwidth of its data source device "D" (104).

Shown at 115 is an exemplary data packet having a header section 115a, a payload section 115b and an error checking and correcting section (ECC) 115c. It is to be understood that each of pipes 111-114 carries digital data packets similar to 115 except that the specific structures, lengths and/or other attributes of packets in each pipe may vary from application to application. (For example, some packets may not include ECC sections like 115c.) Under some communication protocols, the source device (e.g., 104) first requests access through a network pathway that includes the corresponding pipe (e.g., 114) and a destination storage means (e.g., FIFO 134), a domain controller grants that request, the source device then streams a continuous sequence of packets (for example, short packets 134e, and 134f carrying the source data) through the requested network pathway; and when finished, the source device (e.g., 104) relinquishes use of the pathway so that other source devices (or reply-completion devices) can use the relinquished network resources.

Data packets (e.g., 134e, 134f that are received from the respective ingress pipes 111-114 appear at a data-input side of memory region 130 as respective write data flows 121-124. Routing means (not shown) may be provided within the ingress data buffering memory 130 for directing respective data flows 121-124 to corresponding FIFO buffers 131-134 within memory region 130. In accordance with conventional FIFO configuration schemes, each of FIFOs 131-134 has a same data width (bits per storage location) and a same depth (total storage capacity). In accordance with the above cited and co-pending patent application, each of FIFOs 131-134 is a virtual FIFO with a variable memory capacity (e.g., elastic depth) that adaptively conforms at least to the bandwidth of a specific ingress pipe 111-114 or egress pipe 161-164 serviced by that FIFO. In the illustrated example, it is assumed that the depth #3 (or other form of storage capacity) of FIFO 133 is "just right" (neither too much nor too little) for matching the data input rate seen on its, average-sized ingressing data flow pipe 113 and also for matching the data outflow rate seen on its average-sized egressing data flow pipe 163. Moreover, it is assumed that a data block dispatch rate of, say 8Bytes per clock cycle is present both at the input side 153 of the third egress pipe 163 and at its downstream side 173. As such, when a stream of data is scheduled to flow from source 103, through pipe 113, through FIFO 133 and out through egress pipe 163, that data stream should flow relatively smoothly from the data-read coupling 143 of FIFO 133 and through the illustrated dispatcher unit 150 to corresponding dispatcher output coupling 153 (operating at the indicated 8B/cc rate) and then finally, smoothly and continuously out through the downstream discharge end of egress pipe 163 (which downstream end 173 also operates at the exemplary 8B/cc rate).

By contrast, the first (top) FIFO 131 of FIG. 1A is shown to be currently interposed between a relatively wide ingress pipe 111 and a relatively narrow egress pipe 161. This unbalanced situation can lead to a congestion of data packets such as 131a, 131b forming in the topmost FIFO 131 because fat pipe 111 can source the packets in faster than the comparatively thinned pipe 161 can egress the packets (e.g., 131a, 131b) out. As a further contrast in FIG. 1A, the second FIFO 132 is shown to be currently coupled between a relatively narrow ingress pipe 112 and a relatively wide egress pipe 162; where this unbalanced situation can lead to the wide bandwidth of egress pipe 162 being wasted because hardly any data packets such as the lone 132c are dispatched to that wide egress pipe 162. The latter problem can be compounded, as will be seen shortly, if the packets 131a, 131b in the first FIFO 131 are each relatively long and the data stream in the first FIFO 131 is given a strict and highest dispatch priority to the detriment of stream data accumulated in the second FIFO 132.

The concept of adaptively matching FIFO depth to the bandwidth of the corresponding ingress and/or egress pipe that the specific FIFO services is discussed in the above-cited and here incorporated, co-pending patent application. As such that aspect will not be dwelled on too much here. Note briefly that since congestion is more likely to take place in the first FIFO 131 (because 131 resides between a wide ingress pipe 111 and a much narrower egress pipe 161), it is advantageous to make the depth (Depth=#1) of that first FIFO 131 relatively large. By contrast, since emptiness (memory underutilization) is more likely to take place in the second illustrated FIFO 132 (because 132 resides between a narrow ingress pipe 112 and a much wider egress pipe 162), it is advantageous to selectively make the depth (Depth=#2) of that second FIFO 132 relatively smaller. In accordance with the above-cited, co-pending patent application FIFO depth is made a variable function at least of the variable bandwidth of the corresponding ingress pipe, 111-114. Larger FIFO depths are allocated to FIFO's having wider ingress pipes. Comparatively smaller FIFO depths are allocated to FIFO's having comparatively narrower ingress pipes.

There is yet another situation which can develop in the environment 100 of FIG. 1A due to variability of the bandwidths of the respective ingress and egress pipes. Suppose that the egress arbiter and scheduler 170 assigns to the dispatcher 150 the top and strict priority job of dispatching a set of relatively long packet data blocks i.e., 131a, 131b, from the first FIFO 131 at a first data rate (say 8Bytes per clock cycle, or 8B/cc for short) to the upstream side 151 of corresponding but thin egress pipe 161, where the downstream side 171 of that egress pipe has a relatively "thin" output bandwidth of say, 1B/cc. The dispatcher 150 does so by sending an appropriate read address signal to the read address input 149 of memory unit 130 at a latency-accounting time which will allow the desired read data 141 to emerge in time for the momentary closing and reopening of dispatch switch 157. After a first block of 8 bytes from packet 131*a* are read out via path 141 and dispatched by packet dispatcher 150 and over dispatch bus 151 to the downstream-wise thin pipe 161, the relatively thin pipe 161 will be busy for a given number of clock cycles (8 cycles in this example) outputting those many bytes (or, more generally, packet characters) of the long packet block 131*a* at the relatively slow downstream rate (e.g., 1B/cc) of the thin pipe 161. During this duration, the upstream side of the thin pipe 161, namely, dispatch bus 151; will sit idle waiting for the first block of packet data to empty through the slow discharging output 171. (Incidentally, it is assumed here that the upstream side of thin pipe 161 does not have sufficient local storage to receive yet another block (e.g., 8 bytes) of packet data from long packet 131*a* until most of the first block has discharged out through downstream path 171.) In the mean time, as the first data block of packet 131*a* discharges out through the narrow end 171 of pipe 161; the packet dispatcher 150 sits idle, the dispatch bus 151 sits idle and the data read-out paths 141-145 of memory unit 130 sit idle waiting for the first block of packet data from 131*a* to substantially discharge or trickle out via path 171. Then the next block from packet 131*a* is dispatched to the upstream end pipe 161 and again the other resources sit idle waiting for the dispatched block of data to dribble out through narrow outlet 171. This repeats again and again until the highest strict priority dispatch job (e.g., long packets 131*a*, 131*b*) completes.

The reason for why dispatcher 150 and other read-out paths 142-144 of memory unit 130 sit idle for long periods of time while the dispatch job for FIFO 131 completes can vary. In the example given above it is because long data packets 131*a* and 131*b* belong to a data stream that has superceding high and strict priority over other pending streams (e.g., 134*e*-134*f* and therefore commands overriding attention from dispatcher 150 and scheduler 170 to make sure that a certain quality of service (QOS) is maintained by outputting data packets 131*a* and 131*b*, one immediately after the other to the exclusion of all other data that is awaiting a chance to egress out. An additional or alternate reason for why scheduler 170 (if conventionally configured) may dedicate itself to servicing only the first FIFO 131 and corresponding egress pipe 161 is because the network controller granted use of pipe 161 for only a short time and scheduler 170 is trying to complete the job of dispatching packets 131*a*, 131*b* as quickly as possible so that the scheduler may then relinquish use of pipe 161 back for general network use after the dispatching of packet stream 131*a*-131*b* completes. In the illustrated embodiment 100, coupling 145 carries dispatch requests to the arbiter/scheduler 170 from FIFO's in memory unit 130. Coupling 179 carries dispatch job assignments from the arbiter 170 to the one or more dispatch engines provided in region 150. Read address input 149 receives read address signals form dispatcher or plural dispatch engines 150. In one embodiment, each dispatch engine is assigned a corresponding data stream to which it gives exclusive service until the dispatching of that stream completes. The scheduler 170 of that embodiment determines when each dispatch engine can begin dispatching its respective data blocks from a respective FIFO within memory unit 130.

In accordance with the invention, the scheduler 170 designates one of the dispatch jobs as a primary dispatch job. The scheduler 170 tests to see if there is slack time (see 168 of FIG. 1B) during the servicing of the primary dispatch job through a relatively thin pipe 161 in which it might be possible to simultaneously dispatch data blocks of a secondary dispatch job such as 134*e*, 134*f* to a different and available egress pipe such as 164. As will be better seen in FIGS. 1B and 1C, slack time can opportunistically present itself between time points when the dispatcher 150 outputs comparatively wide blocks of data to a comparatively thin egress pipe (one having a relatively narrow downstream discharge outlet, e.g., 171). The scheduler 170 can opportunistically use this slack time to schedule an additional dispatch of one or more secondary streams (e.g., 8B/cc blocks from short packets 132*c*, 134*e*, 134*f*) to a corresponding one or more different egress pipes such as to the illustrated fat pipe 162 or even to relatively narrow pipes such as 164 in the dispatcher's domain. In this way, the other egress pipes (e.g., 162, 164) may be kept efficiently busy and the buffer read-out paths (e.g., 142-144) may be kept efficiently busy even as the scheduler 170 assures that the downstream discharge outlet, e.g., 171 of the primary dispatch job does not run dry at least until a complete packet (e.g., 131*a*) has been discharged.

FIG. 1A may be somewhat misleading in that dispatch paths 151-154 do not have to be separate paths. In one embodiment, dispatch paths 151-154 multiplex through a common dispatch bus having an 8B/cc bandwidth. The dispatcher(s) can only dispatch one data block at a time over this common dispatch bus (not shown in FIG. 1A, see instead 397' of FIG. 3B). The scheduler 170 may pick out the longest running of the pending streams as a primary dispatch job and then the scheduler 170 may try to fit other pending jobs into the slack time of the primary dispatch job. So for example, if the dispatch job associated with FIFO 131 has been designated as the primary dispatch job because FIFO 131 contains a long stream of long packets 131*a*-131*b*, that does not preclude shorter packets from being simultaneously dispatched through respective other egress pipes even as the long job slow dribbles out through its narrow discharge outlet 171. Packets of the primary dispatch job (e.g., FIFO 131) do not necessarily have to be "long" packets. Packets of a threaded-in secondary job (e.g., that of interlacing transmission of packets 134*e*, 134*f* from FIFO 134) do not necessarily have to be comparatively "shorter" packets. These examples are picked simply for amplifying the problem that would evolve if the scheduler 170 limited itself to allowing only one stream to dispatch at a time on an exclusive basis. The main point is that by allowing multiple jobs to dispatch simultaneously, the scheduler 170 will keep the dispatcher(s) 150 and the FIFO memory unit 130 busy for as much of the available time as is possible or practical by detecting slack time in the dispatching of the primary dispatch job (e.g., FIFO 131) and by determining what additional dispatch jobs can be squeezed in to take advantage of the available dispatch bandwidth. Once a first primary job assignment (e.g., that in FIFO 131) completes, the scheduler 170 finds a next still ongoing or pending dispatch job (e.g., that of FIFO 134) to be designated as the new primary dispatch job. The scheduler 170 then tries to opportunistically fill the holes of slack times of that new, primary dispatch job with secondary dispatch jobs.

The graphic exaggeration in FIG. 1A of packet 131*a* being "long" and packet 134*e* being comparatively "short" helps to reinforce several ideas. First is that there can be a large amount of data queued up in first FIFO 131 of this example waiting to egress through the highest priority output path 151 and one reason so much data may be queued in FIFO 131 is because the destination pipe 161 is thin and the ingress pipe 111 is comparatively wider. A second concept is that the short packets like 132*c* may have to unnecessarily wait a long time to egress; even though a wide and unconsumed pipe like 162 sits at the ready but idle because the arbiter/scheduler 170 (if conventionally configured) has given strict priority to the exclusive dispatching of just one packet stream (e.g., 131a, 131b) without considering that the dispatch of other packet streams can be interwoven with the dispatch of the primary job data.

Referring to FIG. 1B, shown is a timing diagram wherein the example of FIG. 1A continues under the assumption that the egressing of Long-A packet 131a through thin pipe 161 is the primary dispatch job assigned to dispatcher 150. The downstream end 171 of thin pipe 161 is assumed to have a 1B/cc discharge rate while the upstream end 151 can absorb 8Bytes in one clock cycle (8B/cc). So once dispatch path switch 157 closes in a first clock cycle to deliver an 8Byte block of data to upstream end 151 of the thin pipe, the dispatcher 150 has to wait (idle) for approximately 7-8 clock cycles before it is required to send in a next block of 8Bytes via dispatch path switch 157 to egress pipe 161.

Timing line 165 marks off the lower digit of the clock cycle numbers such as 00, 01, 02, etc. Line 166 shows the time slots in which each 8B quantum of data is dispatched from the read bus 141 of FIFO 131 to the upstream end 151 of thin pipe 161. The next lower timing line 167 shows the dispatched bytes being discharged through the 1B/cc downstream end 171 at a rate of 1 byte per clock cycle. So at clock cycle 00, the first quantum of 8B of data is dispatched by dispatcher 150 to pipe 161. During clock cycles 01 through 08, the thin pipe 161 is busy sequentially discharging those first 8 bytes. At clock cycle 08, the dispatcher 150 can send in the second quantum of 8B of data. The thin pipe 161 sequentially discharges those second 8 bytes at its 1B/cc rate during clock cycles 09 through 16. At clock cycle 16, the dispatcher 150 can send in the third quantum of 8B of data and so on just as soon as the thin pipe 161 is ready to absorb the next quantum (e.g., 8B) of high priority data from the packets (e.g., 131a, 13b) accumulated in top priority FIFO 131. In this way, the dispatcher 150 keeps the primary egress pipe 161 continuously filled with data at least until the end of the first primary packet 131a is reached. In one embodiment, the primary dispatch job is predetermined stream of packets and the dispatcher is charged with dispatching the full stream before it can deem the primary dispatch job as being complete.

During slack time 168, the dispatcher 150 is free to attend to other tasks. In accordance with the disclosure, the scheduler 170 first determines whether slack time is available during the processing of a primary dispatch job (see step 182 of FIG. 1C). Not all primary jobs necessarily have slack time. For example, if third FIFO 133 had instead been designated as holding the egress packets for the primary job, then just as soon as dispatcher 150 feeds a first quantum of 8B of packet data to the upstream end 153 of third pipe 163, it needs to dispatch the next quantum because the downstream (173) discharge rate of pipe 163 is 8B/cc. Accordingly, it is seen that the scheduler 170 (or another control unit in the system) needs to be cognizant of the discharge rates of the variable width egress pipes and cannot always take advantage of slack time. The scheduler 170 can take advantage when the slack time opportunistically presents itself in a primary dispatch job and there is other packet data (e.g., 134e, 134f) queued in others of the buffers for egress through other egress pipes (e.g., 164) that are not currently busy and can have their appetites for continuous discharge of packet data met by sporadic dispatch of data blocks in the available slack time slots. It has been observed that if continuous discharge is to be maintained for those other egress pipes (e.g., 164), the downstream discharge rates of those other egress pipes should be integer multiples of the discharge rate of the primary pipe (e.g., the 2B/cc rate of secondary pipe 164 is 2 times the 1B/cc rate of primary pipe 161). This allows for continuous periodic satisfaction of the data block appetites of all the currently discharging pipes without any of them having their time of need for replenishment data creep up on the replenishment time of another.

Timing line 176a shows the time slots in which each 8B quantum of data is dispatched from the read bus slot 144 corresponding of FIFO 134 to the upstream end 154 of egress pipe 164. The next lower timing line 177a shows the dispatched bytes being discharged to the 2B/cc downstream end 174 at a rate of 2 bytes per clock cycle. So at clock cycle 01—which is part of slack period 168—the first quantum of 8B of data from packet 134e is dispatched by dispatcher 150 to pipe 164. During clock cycles 02 through 05, the x2 pipe 164 is busy sequentially discharging those first 8 bytes. At clock cycle 05, the dispatcher 150 can send in the second quantum of 8B of replenishment data. The secondary pipe 164 sequentially discharges those second 8 bytes at its 2B/cc rate during clock cycles 06 through 09. At clock cycle 09, after the dispatcher 150 has replenished the primary job on line 167 for clock cycle 08, the dispatcher can send in the third quantum of 8B of replenishment data for the secondary job and so on just as soon as the secondary job pipe 164 is ready to absorb the next quantum (e.g., 8B) of replenishment data from the packet data (e.g., 131e) accumulated in secondary job FIFO 134. In this way, the dispatcher 150 can keep the secondary egress pipe 164 continuously discharging its data at least until the end of the corresponding packet 134e is reached, all while at the same time meeting its obligation to servicing the primary job of dispatching packet data from top FIFO 131 into egress pipe 161.

Shown at 164' of FIG. 1B is a rough graphical analogy of what is happening. Egress pipe 164 can be diagrammed as an upright funnel 164' that receives a first quantum of fluid (data) in its upper conical section 164a' at the time that dispatch path switch 158' momentarily closes for a clock cycle. The 8B of dispensed fluid (data) then discharges continuously through the narrower downstream tube 164b' of the funnel 164' at a rate of 2B/cc for the next 4 clock cycles. Just as the last byte of data is being discharged from tube 164b', dispatch path switch 158' can be momentarily closed for a clock cycle to supply the next quantum of 8B of replenishment data so that no discontinuity appears in the downstream discharge outlet 174' of pipe 164'. The dispatching of successive quantums of replenishment data to primary pipe 161 can be similarly analogized as a timely ladling out of replenishment fluid to an upright funnel except that the lower (downstream) discharge end of that funnel (not shown) will be 1B/cc wide rather than 2B/cc wide. So the scheduler 170 of the invention can be viewed as an efficient chef in a kitchen full of upright funnels like 164') that is smartly ladling out fresh soup (data) in 8B quantums to the top of each funnel on a just in time basis so as to make sure that all funnels have continuous discharges at their downstream ends and that no funnel runs dry before at least its first full packet has been dispatched and outwardly discharged via its respective egress pipe. In one embodiment, the efficient chef also makes sure that he does not oversubscribe himself to keeping more funnels going as continuously discharging streams than the bandwidth of the corresponding one or more dispatchers (soup ladles) can handle. In one embodiment, the efficient chef also endeavors to label a new flow as a primary dispatch job once an original primary job finishes. The slack time, if any, in the new primary dispatch job is used as a measure for determining what further dispatch jobs can be sustained as continuous discharges while the continuity of the primary discharge is also maintained.

It is to be understood that the 8Bytes per dispatch value of dispatcher 150 is just an example and that other values may apply in different embodiments. Moreover, the 1B/cc rate of the thin pipe 161 and the illustrated rates of the other egress pipes 162-164 are also just examples. Other discharge rates may apply. Other front end (upstream end) data storage capabilities per pipe may apply. In FIG. 1B for purpose of further illustration, lines 176b and 177b depict how the scheduler 170 may simultaneously schedule-in the servicing of yet another secondary egress pipe (not shown) having a 2B/cc discharge rate. Lines 176c and 177c depict how the scheduler 170 may simultaneously schedule-in the servicing of yet a further secondary egress pipe (not shown) having a 2B/cc discharge rate. If slack time is available, the secondary egress pipes can have any discharge rate that is an integer multiple (e.g., x2, x½) of the primary discharge rate so that dispatches of the 8B or other quantum of data to each funnel can remain in synchronism without running into dispatch collisions or creating replenishment gaps. The secondary pipe rates do not have to be faster than the primary discharge rate.

Figure 1C:
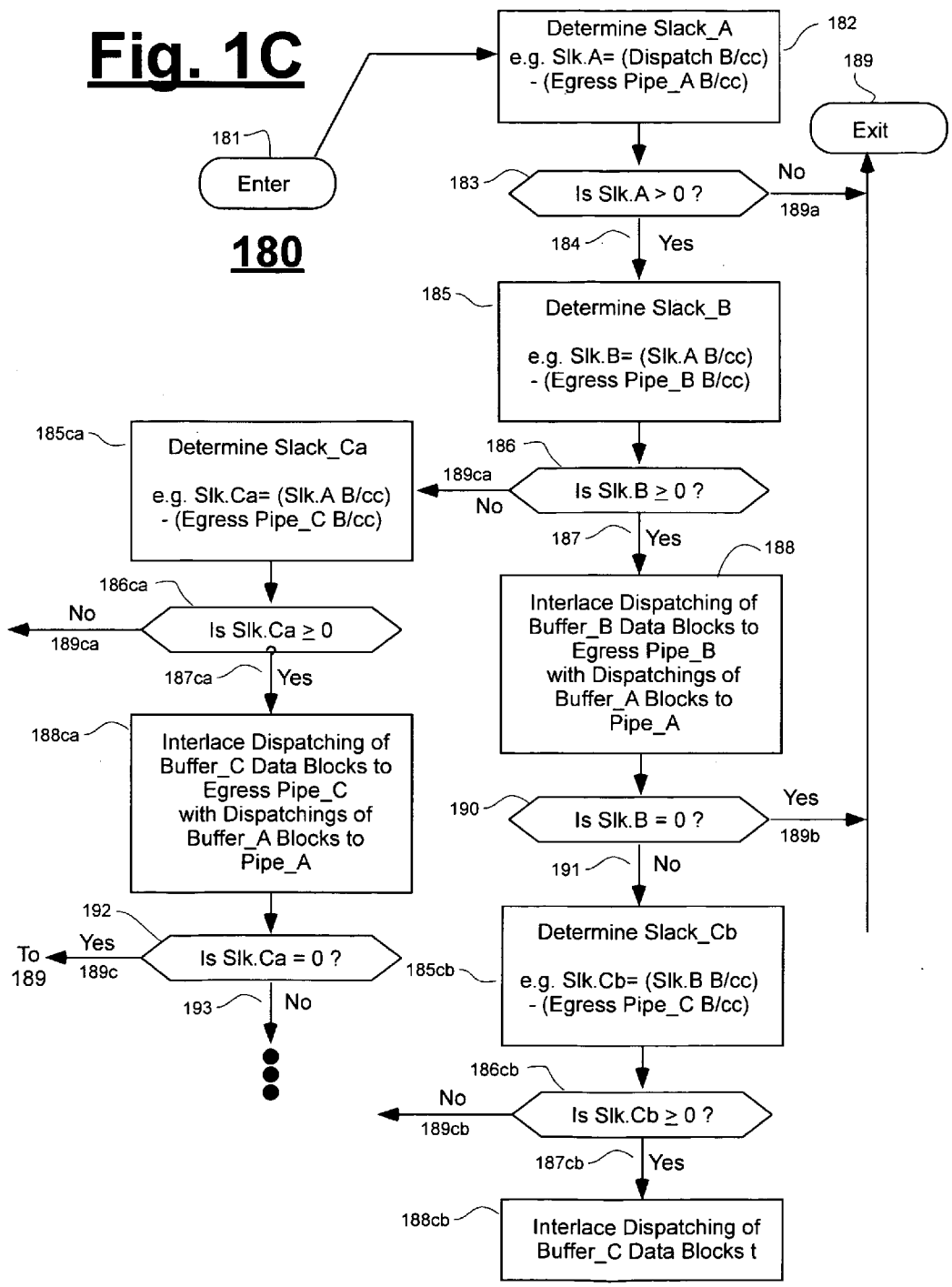
FIG. 1C is a flow chart of a slack determining algorithm in accordance with the disclosure.

Referring to FIG. 1C, shown is a flow chart for one possible machine-implemented method 180 of determining whether there is sufficient slack bandwidth during the dispatching of a primary job such that secondary jobs may be threaded in at the same time. The process is entered at step 181. At step 182 a first amount of bandwidth slack (A) is calculated, for example by subtracting from the dispatcher's rate (e.g., 8B/cc) the downstream discharge rate of the primary egress pipe (e.g., 1B/cc if pipe 161 is the destination of the primary job). Step 183 tests to see if there is any slack. If No (which would be true if egress pipe 163 had been the primary job with its 8B/cc discharge rate) then exit is made by way of path 189a and node 189.

If, on the other hand, step 183 indicates that there is a positive amount of slack, then path 184 (Yes) is taken to next step 185. In step 185 a calculation is performed to see if the first amount of slack (A) is sufficiently large to accommodate the bandwidth needs of a secondary egress pipe, B (e.g., 2B/cc if 164 were that egress pipe B). If test step 186 shows that No, there is not enough slack, path 189ca is taken to a new calculation node 185ca where the difference between the rate of pipe C and Slack A is evaluated. If test step 186 shows that Yes, there is enough slack, path 187 is taken to node 188 wherein pipe-B is added on as a secondary job to be interlaced with the primary job of pipe-A provided that egress pipe-B is available for receiving packets from corresponding FIFO-B at the time that packets from FIFO-A are being dispatched to egress pipe-A.

Step 190 determines whether there is yet more slack for interlacing packets egressing toward pipe-C based on the discharge rate of pipe-C. If not, path 189b is taken towards exit node 189. If, on the other hand, step 190 indicates that there is a positive amount of slack, then path 191 (No) is taken to next step 185cb. In step 185cb a calculation is performed to see if the second amount of slack (B) is sufficiently large to accommodate the bandwidth needs of third egress pipe-C (e.g., 2B/cc if timing line 177b were to represent that third egress pipe C). Step 186cb corresponds in principle to step 186. So there is no need to explicate its details. Step 188cb similarly corresponds in principle to step 188. Step 186ca similarly corresponds in principle to steps 186 and 186cb. Step 188ca similarly corresponds in principle to steps 188 and 188cb. Step 192 corresponds in principle to step 190. The process may continue for a predefined number of secondary egress buffers in the domain managed by the given scheduler and its one or more dispatchers. (In one embodiment, there is more than one dispatch engine and each engine generates read-address signals for the dispatching of packet data from its respective buffer (e.g., FIFO's 131-134).

Referring to FIG. 1D, shown is a flow chart for one possible machine-implemented method 195 of determining which stream should serve as the primary dispatch job and whether additional secondary dispatch jobs can be interlaced (threaded in parallel) with a current primary job. The machine-implemented algorithm 195 is entered at node 194. At step 195a, a stored stream of one or more packets such as 131a-131b of FIG. 1A is selected as the first stream to be designated as the current primary dispatch job. Selection may be made on any desired basis. Generally, the scheduler 170 will pick its currently highest priority egress stream as the current primary dispatch job. In step 195b, a first dispatcher engine is activated to start dispatching the data blocks (e.g., 8B per block) of the stream sequentially from memory to the corresponding egress pipe. Once the first dispatcher engine is busy automatically seeing to the dispatching of the data blocks, the scheduler 170 can check for the option of weaving in a simultaneous dispatch of one or more other streams providing that sufficient slack time is available and another egress pipe is free to receive one of the other streams.

In step 196a, the scheduler 170 determines if the primary dispatch job will complete shortly (e.g., in a next few machine cycles). This can be determined by collecting information on the packet lengths of packets that form the stream and of the discharge rate of the corresponding egress pipe. If the scheduler 170 discovers that yes, the current primary will end soon, the scheduler proceeds to step 196b and looks for another stream to be designated as the next primary dispatch job. If there are secondary dispatch jobs already ongoing, the scheduler will typically designate one of those ongoing secondaries as the next-to-be primary dispatch job. The reason is that the ongoing secondary typically has to finish once it has been started and there could be other secondary dispatch jobs interwoven with the next-to-be primary dispatch job. If there are no ongoing secondary dispatch jobs, then the scheduler 170 is free to pick any other stored stream as the one that is to be the next primary dispatch job. Any of a variety of arbitration schemes may be used, including but not limited to round robin or strict priority being granted to the highest priority stream awaiting egress. Of course, the corresponding egress pipe has to be ready to accept the to-be-dispatched data blocks. Step 196c waits for the soon-to-finish primary job to complete and then designates the newly picked dispatch job as the new primary dispatch job. Control then passes to test step 196d. If the new primary is an ongoing dispatch process then control passes to test step 196a. Otherwise control passes to step 195b where an available dispatch engine (A+) is activated to manage the dispatching of the not yet ongoing and new, primary dispatch job.

If the answer to test step 196a is instead no, meaning the current primary job will be ongoing for a significant length of time, then the scheduler 170 proceeds to step 196e and test whether there is slack time between the primary dispatches, and if so, to determine how much. Steps 182-185 of FIG. 1C may be used to accomplish this task. If there is no slack time for the ongoing, primary dispatch job, control returns to step 196a to await the next primary job and see if that one has slack.

If the answer to test step 196e is yes, there is slack space, control passes to step 196f where the scheduler 170 searches for a next stored stream in the buffers memory (130) whose dispatching can be interwoven into the slack time of the primary dispatch job. Steps 185-186 of FIG. 1C may be used to accomplish this task. If more than one of currently ready streams can be interwoven with the primary dispatch job, the scheduler 170 may use any of a variety of algorithms to determine which combination of secondary dispatch jobs will best fill the available slack time while perhaps also satisfying certain quality of service (QOS) needs or other scheduling requirements. Test step 196g (will found secondary fit?) need not be limited to a single secondary stream and may instead apply to a found combination of secondary jobs. If the answer to test step 196g is yes, there is sufficient slack space, control passes to step 196h where the scheduler 170 starts up one or more additional dispatch engines to manage the dispatchings of the one or more streams that were selected as secondary jobs that are to be interwoven into the slack time slots of the primary job.

At juncture 196i, the scheduler 170 periodically returns to step 196a to check on the progress of the primary dispatch job. At other times, juncture 196i guides the scheduler to step 197a where the scheduler instead tests to see if one of the ongoing secondary jobs will complete soon. If no, control is returned to step 196e to see if there is additional slack time. If yes, control passes to step 197b where the scheduler anticipates what new amount of slack time will become available due to the imminent completion of the secondary job found in step 197a. Given that anticipated amount of slack time (which can include left over slack from the primary job), the scheduler 170 searches for a next one or more stored streams that can serve as substitute secondary dispatch jobs to fill the void of the soon-terminating, secondary job. Step 197c waits for the soon-to-finish secondary job to complete and then designates the newly picked dispatch job(s) as the new secondary dispatch job(s). Control passes to step 196h where an available one or more dispatch engines is/are activated to manage the dispatching of the new, secondary dispatch job(s). Among the secondary job buffers that do qualify for picking as next secondary dispatch jobs, further testing may be made on a round robin selection basis or on the basis of job priority assigned by the egress arbiter 170 or otherwise as may be appropriate to determine which one or combination of secondary buffers to pick.

Thus it is seen from FIG. 1D that slack time made available during the dispatching of primary-job packets can be gainfully used as opportunities present themselves to dispatch awaiting secondary-job packets (e.g., in steps 196f and 197b) to other egress pipes at the same time the primary job packets are being dispatched to a primary egress pipe. When a given dispatcher engine is finished with its stream, it may relinquishes mastery over the network paths it was using back to the network so that the relinquished links may be gainfully used by other devices as appropriate, and the finished dispatcher waits for its next assigned dispatch job, as assigned to the dispatcher by a system controller (e.g., egress arbiter 170).

Referring back to FIG. 1A and stating it otherwise, during slack time when dispatch path switch 157 is not dispatching a next 8B block of data to the primary egress pipe 161, the dispatcher(s) 150 can be kept efficiently busy in accordance with the disclosure, and the buffer memory 130 can be kept efficiently busy in accordance with the disclosure by dispatching other data blocks, if possible, to others of the egress pipes (162-164) in the dispatcher's un-relinquished domain if those other egress pipes are ready to absorb that secondary job data. In determining how long it will take for the primary and/or secondary dispatch jobs to finish, the dispatcher should detect what packet lengths if any are awaiting in the primary and secondary buffers. Packet lengths may vary from packet to packet and/or buffer to buffer. In determining how long it will take for the primary and secondary dispatch jobs to finish, the dispatcher should also detect the downstream discharge bandwidths of the respective egress pipes since pipe width may vary at least between successive boot-ups of the network if not between successive reassignments of network links.

Accordingly, in a situation where there is a long queue of relatively long packets (131a, 131b) in a primary buffer awaiting high priority (primary) dispatch by a corresponding dispatcher resource to a relatively thin pipe (161) and as a result, there will be a great deal of cumulative slack time between successive dispatches (e.g., closing of 8B wide switch 157), the cumulative slack time can be opportunistically used for dispatching other awaiting packets, if any (e.g., 132c, 134e-134f, to available and non-busy, other egress pipes (e.g., 162, 164). Such opportunistic dispatching of secondary job packets helps to prevent undesirable overflow in buffers and/or issuance of back pressure advisements. A given FIFO such as 134 may be deemed "too shallow" for the data flow rate of its respective fat ingress pipe 114 if queuing up packets 134e-134f are not dispatched out at fast enough a rate to make room for newly ingressing packets. In other words, FIFO 134 may fill up with ingressing data at a fairly rapid rate and the FIFO 134 will threaten to enter an undesirable overflow condition if scheduler 170 does not get around to instantiating a dispatch out of the already queued up packets 134e-134f because the scheduler 170 is devoting its resources only to higher priority primary jobs (e.g., servicing FIFO 131). In order to prevent overflows from occurring, in one variation, back pressure signals (e.g. in return flow packets such as 116) can be sent back to the data sourcing device (e.g., 101) telling the source to stop sending more data through the respective fat pipe until the data that is already stored within the too-shallow FIFO (e.g., 134) can be appropriately discharged (read out) by way of a data readout path such as 144. In another variation, and again for purposes of trying to prevent overflows from occurring, buffer-slack-reporting or advising signals (e.g. in packet 116) can be sent back to the data sourcing device (e.g., 101) telling it how much buffer slack space there currently is in corresponding ones of destination FIFO's (131-134). Each data sourcing device (e.g., 101, 104) is given the responsibility in this alternate variation of determining when there is insufficient buffer slack space to send more new data for safe absorption by the corresponding FIFO (131-134).

A number of inefficiencies can be created by the mismatched coupling of a too-shallow FIFO such as 134 to a relatively fat ingress pipe such as 114 where the accumulating data 134e-134f is not dispatched out quickly to an available egress pipe (e.g., 164). First, the wide bandwidth of the fat pipe 114 is wasted every time that a feedback control signal 116 causes the data source device 104 to withhold new data that device 104 wants to send to FIFO 134 via a not-yet-relinquished ingress path 114. Second, control bandwidth may be wasted by constantly sending back warning packets like 116 telling device 104 that slack space in FIFO 134 is small and that the too-shallow FIFO 134 is again threatening to overfill. Another drawback is that of increased danger that the too-shallow FIFO 134 actually will overfill and thus create an error condition, one such error condition being that already-transmitted telecommunication data is lost after having been successfully stored in memory unit 130. Another drawback is that data source device 104 may not relinquish the resources of path 114 back to the general network until device 104 has finished outputting its respective stream of packets (e.g., 134e-134f to FIFO 134 and perhaps received confirmation (e.g., a completion packet) that the data was received without error. The overall bandwidth of the network suffers when interconnect resources such as path 114 are tied up for longer times than necessary.

Another and similar inefficiency occurs on the egress side if a not-yet-relinquished egress path 164 is available in the programmably reconfigurable network, and if packets 134e-134f are sitting in buffer 134 awaiting dispatch and the scheduler 170 is not making use of the available bandwidth. In such a case, the scheduler 170 may refuse to relinquish the resources of path 164 back to the general network until device 150 has finished outputting the respective stream of packets (e.g., 134e-134f) to a next destination and perhaps received confirmation (e.g., a completion packet) that the data was received without error. The overall bandwidth of the network suffers when interconnect resources such as path 164 are tied up for longer periods of times than necessary.

Another and similar inefficiency occurs on the data output side of memory unit 130. Respective output signals 141-144 of memory unit 130 are read out on a time domain or other multiplexing basis from respective FIFO's 131-134 and sent over a memory output bus (or buses) into dispatcher 150. The dispatcher 150 routes the data packets for egress through egress paths 151-154 in accordance with, for example, routing tag data (not shown) that accompanies the data blocks of the various packets. Under certain circumstances, the scheduler 170 can be overwhelmed with too many, conflicting dispatch requests at a same time. To deal with this problem, one of the functions usually implemented within the scheduler 170 is that of providing a control feedback channel 156 that sends feedback control packets 116 to the various data source devices 101-104 indicating to them that they may need to take corrective action to avoid possible data overflow, underflow or quality of service (QOS) failure problems. In one variation, the scheduler 170 keeps track of the amount of spare or slack space in each of the FIFOs 131-134 under its control. This is done by keeping track of empty memory space present between the write pointer for ingressing data (e.g., 121) and the read pointer for egressing data (e.g., 141 of FIFO 131 for example). This slack space information may be packaged into the return packets 116 that are sent back to the data sources as slack advisements. Although FIG. 1A shows feedback path 156 returning only to data source device 101, it is to be understood that this done for sake of illustrative brevity. In practice, each of the data sourcing devices 101-104 will normally have advisement feedback data sent to it. The data sources 101-104 may use the FIFO-slack information that is included in the feedback data to determine which destinations their respective outputs may be safely directed to and which destinations should be left unbothered for the time being. Although FIG. 1A shows data source device "A" (101) as directing all of its output into the fat ingress pipe 111, in one embodiment data source device A has the option of spending some of its bandwidth directing output to other pipes and/or other devices besides dispatcher 150 and its preceding ingress data buffering memory 130. Similarly, each of data source devices 102-104 might be able to intelligently redirect parts of their respective output bandwidths to other destinations when dispatcher 150 and/or its ingress side buffer 130 are already too overwhelmed with current work loads (e.g., retrying egress transmissions of noise-infected signals).

The output of dispatcher 150 is shown to include data output flows 151-154 going to respective egress pipes 161-164. The illustrations of comparatively thin and fat widths for these egress pipes 161-164 is for purpose of example just as was the case for ingress pipes 111-114. Pipe 161 is shown as being currently thin (e.g., having a downstream bandwidth of 1Byte per clock cycle) and therefore pipe 161 needs 8 clock cycles to finish transmitting an 8B data block sent to it in one clock cycle by dispatch switch 157. This concept is shown in lines 166-167 of the timing diagram of FIG. 1B. Egress pipe 162 is shown to be relatively fat (e.g., downstream bandwidth of 16B/cc) so that it can easily absorb in one clock cycle each 8B data block sent to it via output path 152. Egress pipe 163 is shown to be of matched downstream bandwidth (e.g., 8B/cc at 173) to output path 153 so that egress pipe 163 also can easily absorb in one clock cycle each 8B data block sent to it. Egress pipe 164 is shown to be relatively thin (e.g., downstream bandwidth of 2B/cc) so that it requires 4 clock cycles to finish outputting each 8B data block sent to it via output path 154. This concept is shown in lines 176a-176b of the timing diagram of FIG. 1B. Although not shown, the respective downstream data output flows 171-174 of the various egress pipes 161-164 may continue to data receiving devices, where the latter data receiving devices may include some or all of data source devices 101-104. The receiving devices may send back pressure feedback signals and/or other quality of service (QOS) signals back to egress arbiter 170 as part of the control mechanism for determining which data streams are to be next serviced by the one or more dispatcher engines 150 present in the system and which queued up data streams are to receive lower priority servicing. For purpose of simplicity, such additional control pathways are not shown in FIG. 1A. Another note about FIG. 1A: Although it shows a particular mix of ingress and egress bandwidths for each of FIFO's 131-134, in practice each of FIFO's 131-134 may see a programmably varying environment on its respective ingress and egress sides because the bandwidths of its respective ingress and egress pipes may be dynamically varied. This aspect will become clearer with next-described FIG. 2. Incidentally, the processing of data stored in the data-absorbing buffers 131-134 need not be limited to just dispatching or routing via use of switches such as 157. This is merely an example. The data-absorbing buffers 131-134 could have been positioned as post-processing buffers or mid-processing buffers for different kinds of packet reprocessing operations. More typically the buffers 131-134 occupy a pre-processing position in the data processing subsystem that includes items 110, 130 and 160.

FIG. 2 provides a more detailed explanation of how the variable bandwidth conditions described for FIG. 1A may come into being within a PCI-express™ system 200. In the illustrated PCI-express environment 200, a multiplexed first serial physical link such as 211 couples a high frequency output amplifier 201 to a corresponding input amplifier 221. (The illustrated multiplexed serial physical link 211 is merely conceptual and may be implemented by use of plural twisted wire couplings rather than just one.) Multiple channels of data may be transmitted over the first multiplexed serial physical link 211 by use of one or more forms of signal multiplexing. Time domain multiplexing (TDM) may be used for example, on the physical serial link 211 for mixing together the data of a number of sub-channels or "lanes" of data as they are called in PCI-express so as to define an aggregated logical channel of data flowing into a corresponding logical "port" or PCI-Express "link" 271. In the example of multiplexed serial physical link 211 and its corresponding, first ingress port 271, system configuration operations have created an aggregation of four lanes numbered 1-4, with each lane being one byte (B) wide. A physical layer interface portion 231 (PHY) of PORT_1 (which port is also identified as port 271) receives the serially transmitted signals of multiplexed link 211 (e.g., a differential and optically encoded signal sent over a complementary twisted wire pair) and converts the received, serial data into four parallel data flows that respectively flow into respective Data Link layer sections DL1, DL2, D13 and DL4 of column 241. After appropriate error checking and/or error correction (e.g., ECC, CRC) operations take place in DL column 241, the respectively ingressing signals of the 4 lanes continue into transaction layer (TL) column 251 of Port_1 for transaction level processing. TL processed data words (e.g., bytes) are then temporarily stored in respective data sequence storage units or data stacks (mini-FIFO's) St-1.1 through St-1.4 of Port_1 as seen in column 261. The outputs of stacks St-1.1 through St-1.4 feed into an ingress multiplexer 280. (Stacks St-1.1-1.4 incidentally, are not push-pull type CPU stacks, but rather a means for temporarily stacking up the received ingress data of their respective lanes. They are small pre-buffers relative to the larger data-absorbing buffers (e.g., FIFO's) 293 maintained in memory unit 290 for absorbing the aggregated data flows of each plural ports 271-27N.)

At the same time that serialized data is flowing into Port_1 (271) at a respective first, aggregated data rate (which rate is established by aggregating four lanes together to define Port_1 271), other serialized data may be flowing into Port_2 (272) at a respective second, aggregation-defined data rate, different from the first data rate. In the illustrated example, the second port, 272 has been configured to receive two lanes worth of PCI-express traffic as compared to the four lanes worth that first port 271 has been configured to receive. The Port_2 data moves through physical (PHY) layer 232, then through DL layer 242 as respective two lanes of data, then through TL layer 252 before reaching respective stacks St-2.1 through St-2.2 of Port_2 as seen in column 262. The outputs of stacks St-2.1 through St-2.2 feed into the ingress multiplexer 280 via what is termed as a x2 link (a by two link).

It should now be apparent that the ingress multiplexer 280 may be viewed as having plural channels coupled to it with potentially different rates of data input flows ingressing towards it from the first and second PCI-express ports, 271 and 272 (the actual rates being dependent on current traffic conditions on physical links 211 and 212). For purpose of completeness, FIG. 2 shows that there can be a number N of differently configured ports, where the last port in the series, 27N is configured to receive an aggregation of m lanes of data (a by-m logical link) from physical link 21N. Physical layer 23N deserializes the data into data link sections DL1 through DLm of column 24N. The data continues through transaction layer 25N and into stacks respective stacks St-N.1 through St-N.m of the m-lane Port_N as seen in column 26N. The outputs of stacks St-N.1 through St-N.m feed into the ingress multiplexer 280.

In the illustrated example, the ingress multiplexer 280 has an m'-Bytes wide parallel output bus 285 feeding into the Data_In port of a Common Ingress Buffering (CIB) Memory unit 290. In one embodiment, m' is equal to m, where the latter value is the largest number of aggregated lanes permitted among the N ports of the system 200. This parallel width of bus 285 allows a by-m port (a xm Link) to write all m of its output bytes into the memory 290 in one clock cycle. In other embodiments, m' may be of a different value, this depending on the clock speed maintained on multiplexer output bus 285. In one embodiment, for example, m' is equal to 4, thus causing parallel output bus 285 of the multiplexer to be 32 bits wide.

The big picture import of FIG. 2 is that the ingressing data streams from temporary stacks St-1.1 through St-N.m are further buffered in the CIB (Common Ingress Buffering) memory unit 290 before being output via output bus 295 for further processing. The CIB memory unit 290 provides the primary buffering or data-absorbing buffer function for the ingressing data streams while the mini-stacks St-1.1 through St-N.m provide buffering to a much smaller, lane-by-lane, and more temporary degree. The present disclosure is primarily directed to the problem of how to allocate the output bandwidth of bus 295 of the Common Ingress Buffer memory unit (CIB) 290 given the packet dispatch problems identified in FIG. 1A and the solutions suggested by one or more of FIGS. 1B-1D. More specifically, block 293 in CIB memory unit 290 is shown to contain a plurality of FIFO's for storing the packet data of respective streams of packets. If each of ports 271, 272-27N is programmably configured to have m lanes (and if each lane carries just one virtual channel, v=1 worth of data), then in one embodiment, block 293 will contain at least N same-sized FIFO's; one FIFO for each channel. If some ports are programmably configured to have less than m lanes during system configuration (but still v=1 virtual channels per lane) while others have m lanes, then block 293 will still contain at least N FIFO's, then according to one aspect of the present disclosure, some of the region 293 FIFO's will be deeper than others so as to adapt to different ingress bandwidths of the respective ingress ports. If one or more of the ingress ports is further configured to have a plural number of virtual channels, then the number of FIFO's implemented in block 293 will be equal to the total number of virtual channels present on the left side of multiplexer 280; the maximum value of that number being N*m*v' where v' is the maximum number of virtual channels allowed per thinnest lane. (Actual values of N, m and v' can vary from application to application.) It is seen therefore that the dispatch manager (298) of the system can have a large number of pending streams to deal with.

Figure 3A:
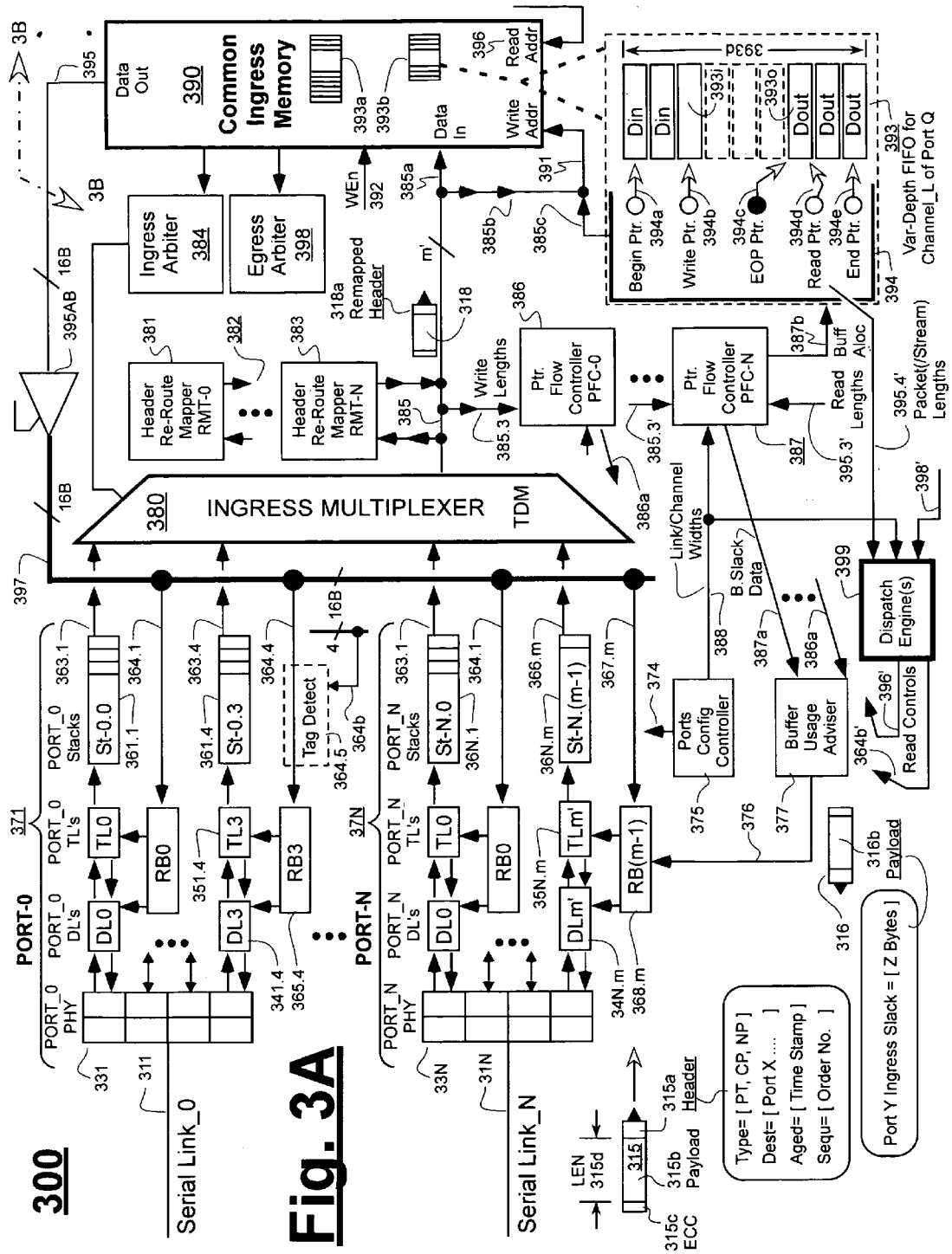
FIG. 3A is a schematic diagram of PCI-express compatible, data transfer device wherein virtual FIFO's are automatically configured to have respective depths corresponding to lane speeds assigned to respective ports during network configuration.

Under conventional practice in the PCI-express field, practitioners did not account for the rate differences of faster ports (e.g., 271) versus slower ports (e.g., 272) as configured on the left side of multiplexer 280. They merely counted the number of virtual channels and provided a corresponding number of FIFO's, each of identical size in block 293. By contrast, and in accordance with one aspect of the present disclosure, the corresponding number of FIFO's in block 293 are not necessarily of the same size, but rather, FIFO size is made dependent at least on the specific data flow bandwidths of the variably-adjustable ports and/or virtual channels provided on the left side of multiplexer 280. Further, under conventional practice in the PCI-express field, practitioners did not account for slack time or slack bandwidth in the dispatch path 295 whereby all or part of output bus 295 is being wasted because data is being sporadically dispatched to an egress pipe with a relatively narrow discharge end. The egress pathways are not yet shown in FIG. 2 in order to avoid premature over complication. An example of egress pathways is shown in FIG. 3A. See for example, retry buffer 368.m of xm port 37N in FIG. 3A.

Referring still to FIG. 2, an ingress buffers control unit 291 is shown operatively coupled to the CIB memory unit 290 by way of bus 292 for coordinating the storage of ingressing data within CIB memory unit 290. An ingress multiplexer control unit 281 is shown operatively coupled to the ingress multiplexer 280 by way of bus 282 for coordinating the selection activities of the ingress multiplexer 280. The ingress buffer control unit 291 operatively couples to the ingress multiplexer control unit 281 by way of bus 297. An egress job picking and job dispatching unit 298 is shown operatively coupled to the CIB memory unit 290 by way of bus 299 for coordinating the reading out of stored data from FIFO's 293 in accordance with egress priorities established within the system 200. The egress priorities may be functions of one or more factors such as promised Quality of Service (QOS) guarantees made for respective communication channels, aging of packets in the main FIFO's region 293, reduction of slack space below predefined thresholds in one or more of the FIFO's of region 293, growth of slack space above predefined thresholds in one or more of the FIFO's 293, and availability of network resources.

Before referring in more detail to FIG. 3A, some additional background on PCI-Express may be in order at this point, particularly as it applies to negotiated lane aggregation and/or port bifurcation. The more standard, PCI bus is a well known form of standardized signal interchange within the field of digital computer and communication system design. One lesser known extension of the PCI bus standard is referred to as PCI-X. An emerging, but not as yet, well known extension of these is referred to as PCI-Express. The three should not be confused with one another. The present disclosure is mostly directed to the industry-defined, PCI-Express protocol but can also be applied to other serial link protocols that support programmable port configuration such as HyperTransport™ for example.

PCI-Express has some unique attributes among which is use of a type of data exchange known as a non-posted split transactions and posted transactions. The split transaction involves two types of packets: a completion packet (CP) and a companion non-posted packet (NP). The posted transaction uses a third type of packet identified, appropriately, as the posted transaction packet (PT).

PCI-Express is further characterized by its use of high speed serial links and of packets structured to move through such high speed serial links. Like other communication standards, the PCI-Express protocol has a layered architecture that includes (1) a Physical signaling layer, (2) a Data link layer and (3) a Transaction layer. The Physical signaling layer of PCI-Express is typically characterized by use of a Low-Voltage Differential Signaling (LVDS) high-speed serial interface specified for 2.5 GHz or higher signaling per lane, while further using 8B/10B or like link encoding and using AC-coupled differential signaling. A complementary set of LVDS pairs is sometimes referred to as a physical link. The PCI-Express standard allows for re-configurable lane combinations within each port so as to thereby form different numbers of wider (faster) or narrower (slower) communication ports designated as x1, x2, x4 and so on up to x32; where the x1 configuration of a given port is the slowest (narrowest) and the x32 configuration is the fastest (widest). Multi-lane links can provide for higher bandwidth communication capabilities than can a comparable single-width link that has long dead times. The Data link layer of the PCI-Express protocol is typically characterized by packet exchange standards that govern how packets route between neighboring PCI-Express entities and over its single or multi-lane highways while assuring data integrity and providing for sequence checking, along with packet acknowledgments and flow control. The Transaction layer of the PCI-Express protocol is typically characterized by standardized rules for translating data read and/or write requests as they move through switching nodes between an intelligent host and one or more endpoint devices.

There is much to the PCI-Express standard that is beyond the scope of the present disclosure. More information about the standard may be obtained via the internet from the official website for the PCI Special Interest Group.

The PCI-Express standard was initially designed for a single host environment, meaning that it was originally structured to have only one, intelligent host (i.e. a microcomputer or CPU) interfacing with a plurality of less intelligent endpoint devices such as memory units and wired or wireless communication ports. The host was expected to function as the "root" of the PCI-Express network hierarchy tree and to initialize the network, while the rest of the tree was formed of branches made of serial links, bridges and switches that provide signal routing (packet routing) between the host and an array of subservient, endpoint devices hanging off the branches as leaf nodes. Over time, methods have been developed to support multi-root networks. Details on this are beyond the scope of the present disclosure, but suffice it to say that multi-root networks can boot-up in different configurations depending on the states of devices in each of the root complexes. A network can be brought up at different times with some of its root complexes being inoperative and others being operative. Designers may not know until network bring-up and self-discovery commences what port configurations should be employed in order to make efficient use of available resources.

One set of function that occurs during network bring-up and resource discovery is known as lane aggregation and port bifurcation. Devices negotiate with each other as to how each should set its ports to be configured in the allowed spectrum of x1 to x32 lanes per port and 1 through N ports per operative device on the network. Ports may additionally be bifurcated after lane aggregation into a plural number of logical channels. In other words, it is often not known until network bring up time how ports will aggregate into one number of lanes per port and then degenerate or bifurcate into a second number of channels per port depending on how dynamic negotiations proceed within a variable, multi-root or single root environment. This raises the problems first by way of simplified FIG. 1A.

Referring now to details in FIG. 3A, shown is a PCI-Express compatible device 300 (e.g., a monolithic integrated circuit chip) having N+1 PCI-express compatible ports denoted as Port_0 through Port_N. Each port can be degenerated into just one lane or aggregated into m lanes during bring-up negotiations, where m can be a different number (up to a pre-defined maximum, e.g., 32) for each port. Each port can be further bifurcated into V virtual channels. In the illustrated example, Port_0 (371) has been aggregated into an x4 configuration (it contains 4 lanes) while Port_N (37N) has been aggregated into a by-m configuration. PHY portions 331-33N of each port are shown as in FIG. 2 as well as DL, TL and Stack portions. Each stack portion (e.g., 361.1-36N.m) corresponds to a given lane within its respective port. Additionally, the signal egress aspects of each port are shown in FIG. 3A whereas they were not shown in the simpler FIG. 2. The signal egress aspects are represented by the bi-directional couplings such as between DL and TL blocks and also by inclusion of Retry Buffers such as RB0 through RB(m-1) {latter also denoted as 368.m}. The retry buffers (e.g., 368.m) temporarily store egress data. This temporarily stored egress data is retransmitted out to the physical link (e.g., 31N) in cases where line noise or other problems occur on the corresponding link (311-31N) or elsewhere in the network. If noise corrupts a first-time transmitted version of the egress data, the data may have to be re-transmitted a second time in response to a retransmit request or non-receipt of a confirmation. System designers can avoid having to reprocess the corrupted data by temporarily storing processing results (e.g., post-switching packets) in the retry buffers (RB's).

In the illustrated embodiment 300, the maximum allowed lane aggregation is x16 and therefore the maximum bandwidth for egressing data is 16B per clock cycle. Egress data moves from a 128 bit (16Byte) tri-state dispatch bus 397 (driven by tri-state drivers 395A,B) into respective retry-buffers (RB0-RB(m-1)). A parallel routing bus 364b that is 4 bits wide is shown partially adjacent to tag detector 364.5. If the illustrated example 300 is modified to allow a largest aggregation value per port equal to the PC-Express allowed maximum of x32 lanes, then routing bus 364b would instead be at least 5 bits wide and dispatch bus 397 would be 32B wide, where the 5 bit or greater width of bus 364*b* allows selective unicast routing to any one of up to 32 one-byte wide lanes. (Bus 364*b* would be wider if it also supports multicasting codes.) On the other hand, if the illustrated example 300 is modified to allow a largest aggregation value per port of 8 lanes, then routing bus 364*b* need not be wider than 3 bits and dispatch bus 397 need not be wider than 8B. The width of dispatch bus 397 limits the dispatch bandwidth of the system. The example of FIG. 1B assumed an 8B wide dispatch bus and hence an 8B/cc dispatch bandwidth. The illustrated example of FIGS. 3A-3B instead assumes a 16B wide dispatch bus 397 and hence a 16B/cc dispatch bandwidth, the point being that dispatch bandwidth is finite and sometimes the downstream discharge bandwidth of an egress pipe is less than the bandwidth of the dispatch bus (e.g., 397).

When the downstream discharge bandwidth of a primary egress pipe (e.g., 161 of FIG. 1A) is less than the bandwidth of the dispatch bus (e.g., 397) that means that there is slack-time between the successive dispatches (e.g., line 166 of FIG. 1B) of the primary dispatch job. The slack time may be sufficiently large to allow for the interleaving of successive dispatches (e.g., line 176*a* of FIG. 1B) of a secondary dispatch job. A scheduler in accordance with the disclosure detects if and when slack time is available on the dispatch bus and determines whether one or more secondary dispatch jobs (e.g., lines 176*a*, 176*b*, 176*c* of FIG. 1B) can be simultaneously interwoven with the primary dispatch job.

In FIG. 3A, unit 375 (Ports Configuration Controller) stores the port aggregation and channel bifurcation information after network bring-up negotiations complete. Lane aggregation control signals propagate on bus 374 to the respective N+1 ports while the so-called link-width or aggregation number (x1, x2, . . . x16, . . . x32) is output on bus 388 to PFC units 386-387 and also to the egress scheduler-manager combination 398/399. Due to space constraints in the drawing, FIG. 3A shows bus 388 linking to one or more dispatch engines (D.Eng's, only one shown) 399. It is to be understood that this implies coupling of the link and/or channel width information to egress scheduler 398. In one embodiment, each PFC unit (e.g., 387) receives only the link-width (aggregation number) of its corresponding port via line 388 and responds accordingly in allocating buffer depth to FIFO's such as 393*a*, 393*b*, 393 as is further detailed below. In an alternate embodiment, each PFC unit (e.g., 387) also receives an indication over bus 388 of how many virtual channels are being programmably implemented on its corresponding port (e.g., Port_N) and/or what the bandwidth of each of those channels is. In yet another alternate embodiment, each PFC unit (e.g., 387) also receives an indication of how many virtual channels and/or lanes are being programmably implemented/aggregated on one or more of the other ports besides its own port, and the PFC unit responds accordingly as is detailed below. The scheduler/dispatch manager combination 398/399 uses the supplied ports width and/or channels width signal 388 in combination with one or both of supplied packet lengths signals 395.4' and supplied egress job assignments 398' for generating read control signals 396' which are coupled at least to read address input 396 of memory 390. The read control signals 396' determine which packets are having their data output on memory output bus 395 and through tri-state drivers 395A,B for egress via the retry buffers of one or more of ports 0 through N. In one embodiment, the dispatch engine(s) 399 output egress channel tag data 364*b*' via bus 364*b* to tag detectors such as 364.5 (only one shown for RB3). The tag detectors indicate to the respective retry buffers which data on party line 397 is to be picked up by that retry buffer or not. Tag data may be used for multicast operations as well as unicast operations. The dispatch engine(s) 399 output corresponding read address signals 396' and routing tag codes 364*b*' at different times in one embodiment so as to account for memory read latency in unit 390. In one embodiment, lengths signals 395.4' represent lengths of packet streams that are to be output as continuous bursts rather than lengths of individual packets. The scheduler/D.Eng combinations 398/399 may use this packet/stream information to determine when a given primary or secondary dispatch job is going to finish and thereby potentially open up new slack time on the dispatch bus 397. (See FIG. 1D.)

There can be N+1 Pointer Flow Control (PFC) units 386-387 in system 300, and also N+1 D.Eng's (399), one for each of ports 0 through N respectively. Each PFC (386-387) receives from bus 388, at least the link width value of its respective port. Using at least this link width data (388), each respective Pointer Flow Control unit (e.g., 387) establishes the depth of one or more virtual and elastic FIFO's (e.g., 393*a*, 393*b*) within memory unit 390. In other words, FIFO depth of one embodiment is made to be a variable function of link width data transmitted over line 388. The FIFO depth (e.g., 393*d*) of a given virtual FIFO (e.g., 393 which FIFO is shown in magnified form at the bottom right of FIG. 3A) can be defined as the storage space provided between the start location identified by a begin pointer 394*a* of the given virtual FIFO and the end location identified by an end pointer 394*e* of the FIFO. Pointers 394*a* and 394*e* are stored in a pointer memory unit 394. Those skilled in the art will appreciate that the virtual FIFO's or other such data-absorbing buffers can be programmably defined using a number of variations including use of base and offset addresses. For example, the end address (394*e*) of a FIFO can be identified by an offset from the begin address (394*a*) where that offset corresponds to the depth (393*d*) of the given FIFO (393). Among the buffer pointers managed by PFC units 386-387 there can be End-of-packet pointers (EOP) such as the one shown at 394*c*. Alternatively or additionally, packet length data may be held in packet headers and obtained therefrom. Alternatively or additionally, packet stream length data may be held in packet headers and obtained therefrom. By determining the amount of memory storage represented by the gap between the current read pointer 394*d* and the end of a given packet (as indicated for example by the EOP pointer 394*c*) or the end of a given packet stream, the remaining length of the packet or stream of packets can be determined and can be output on line 395.4' for use by the scheduler/D.Eng combination 398/399. The scheduler can combine this packet length information 395.4' with the lane widths information 388 for determining how much time remains before a currently ongoing dispatch job completes and thereby creates new slack time on the dispatch bus 397. The scheduler may use this information to plan ahead for quickly replacing a completing dispatch job with a new one so as to thereby make efficient use of the finite bandwidth available on the dispatch bus 397. As explained above, opportunistic use of slack time, when present, can make better use of the signaling bandwidth available on busses 395, 397 and/or better use of the packet processing bandwidth available in each dispatch engine 399.

The problem discussed for FIG. 1A is solved by causing the scheduler 398 to opportunistically take advantage of slack time, when available on dispatch bus 397, by interweaving one or more secondary dispatch jobs during the dispatching of primary job data blocks to corresponding egress channels. The scheduler 398 may detect slack time opportunities by monitoring packet lengths (395.4') and current bandwidths of designated egress channels as indicated by their respective channel widths on line 388. As a first dispatch job completes and thereby creates bandwidth openings on dispatch bus 397, the scheduler 398 can responsively interlace one or more secondary job dispatches into those openings by appropriately managing the one or more dispatch engines 399 that cause the packet data to dispatch from memory unit 390 and over bus 397 to a corresponding one or more egress channels. Additionally, in one embodiment, the depths of data-absorbing buffers (e.g., virtual FIFO's 393*a*, 393*b*) are made functions of at least the bandwidths (link widths 388) of their corresponding communication channels so that those virtual FIFO's that are fed by relatively wide ports and/or relatively wide virtual channels are deeper than those virtual FIFO's that are fed by narrower ports and/or narrower virtual channels. In one embodiment, at least three virtual FIFO's (e.g., 393*a*, 393*b*) are defined for each PCI-express port or virtual channel (VC): one for to-be-egressed PT packets of that port/channel, a second for to-be-egressed CP packets and a third for to-be-egressed NP packets of that port or virtual channel. In that environment it is possible to interlace the dispatchings of data blocks from the PT, CP and NP buffers of a given memory area (e.g., 393.S) to respective but different egress pipes so that the given memory area is not overwhelmed by newly ingressing packet data. Provision of separate virtual FIFO's for different packet types is shown in block 393.S of FIG. 3B; which is discussed below. (Note that a packet type field may be included in header 315*a* of PCI packet 315, where the type field may be used to indicate if the packet is a PT, CP or NP type. In one embodiment, NP packet are generally shorter in length than CP packets; and thus when long CP packets are dispatched as part of a primary job stream, the typically shorter NP packets can be simultaneously dispatched as secondary dispatch operations if slack time is available.)

Referring to the pointer memory unit 394 of FIG. 3A, provided between the begin pointer 394*a* and the wraparound end pointer 394*e* of each virtual FIFO (e.g., 393, 393*a,b*) there are at least two advanceable pointers: a write pointer 394*b* and a read pointer 394*d*. Each time a new ingress byte is written into a next empty byte slot 393*i* in the corresponding virtual FIFO, the write pointer 394*b* advances by one. (Other increments with interlace are of course possible.) Each time an aged egress byte is read out from the oldest filled slot 393*o* (or head) of the corresponding virtual FIFO (e.g., 393*b*), the respective read pointer 394*d* advances by one. (Other increments with interlace are of course possible.) EOP pointers such as 394*c* may be used to keep track of where one packet ends and a next begins within the filled portion of the respective FIFO 393. End-of-Stream pointers (EOS, not shown) may be used to keep track of where one packet stream ends and a next begins within the filled portion of the respective FIFO. The unfilled or slack space that exists between the filled oldest slot 393*o* and to-be-filled newest data slot 393*i* in the FIFO can be computed from knowledge of the current values of the write pointer 394*b* and the read pointer 394*d* as well as the FIFO begin and end pointers (394*e*-394*a*).

Pointer Flow Control unit 387 of Port N is shown as receiving two signals: the latest write lengths for Port_N FIFO's on bus 385.3' and the latest read lengths for Port_N FIFO's on bus 395.3'. Pointer Flow Control unit 386 is understood to receive corresponding write and read length indicating signals for virtual FIFO's of its respective Port_0. By keeping track of current write and read lengths for each virtual FIFO of its respective port and/or port-internal lanes; and by knowing the FIFO begin and end addresses (394*a*, 394*e*) that have been programmably defined for its virtual FIFO's of its respective port (see FIG. 3B), each Pointer Flow Control unit (386-387) can compute the current amount of buffer slack space (unfilled memory space) available in the respective virtual FIFO's (e.g., 393) of its port. The current buffer slack space amount is reported or "advertised" back out into the network using feedback packets such as 316. For the case of PFC_N (387), line 387*a* transfers the currently computed, buffer slack data to a buffer usage adviser unit 377 associated with the respective link of the respective, virtual FIFO (393). The buffer usage adviser unit 377 couples to the link's Retry Buffers (e.g., 368.*m*) by way of line 376. It generates appropriate feedback packets like 316 that contain in their payload section 316*b* or elsewhere, indications of the amount of buffer slack space available in corresponding ones of the virtual° FIFO's (e.g., Port Y ingress slack=[Z Bytes]). The buffer usage adviser unit 377 then causes the generated feedback packets (e.g., 316) to be sent out from the corresponding port at appropriate times when the physical link (e.g., 31N) has bandwidth available for such function. In one embodiment, the slack space data is packed into the headers of egressing packets (316) rather than into their payloads sections (316*b*). The payloads sections are used transporting output data of the dispatcher(s) (150 in FIG. 1A, 399 in FIG. 3A) and/or of another data processing unit that outputs to the respective port (e.g., 37N). Buffer slack space as used herein should not be confused with the slack time that becomes available on the dispatch bus 397.

As ingressing PCI-express data accumulates in the lane stacks St-0.0 through St-N(m-1), an ingress arbiter 384 uses data collected thus far to determine which link or links will be next serviced by ingress multiplexer 380 and memory unit 390. The length of packet data that is written into memory 390 per servicing may vary depending on packet type and the amount of payload data carried by each of the ingressing packets. Typically, one or more bytes (e.g., header bytes) output by the ingress multiplexer 380 will contain data indicating the packet length of each ingressing packet 318 and/or total length of the associated stream of packets and/or logical data order within the stream. The packet length data is sent to the PFC's (386-387) as respective write length information (385.3). Reported write length information is used for reducing the current buffer slack count for the affected virtual FIFO (e.g., 393*a*). Update of the slack count may happen while the corresponding packet 318 continues to move from multiplexer 380 and on bus 385 for input into, and writing into the common ingress memory unit 390. The specific virtual FIFO (e.g., 393*a*, 393*b*) which the packet 318 will be written to may be selected by destination address data placed in the packet's header 318*a*. In one embodiment, a plurality of header re-route mapping tables 381-383 are provided for intercepting packets output by multiplexer 380, reading their original header data via connection 382 and storing remapped header data into them also via connection 382. The remapped header data feeds forward by way of path 385*b* to form part of the write address signal 391 that drives the common memory unit 390. Actual packet data is delayed relative to write address signals so as to account for the write latency of memory unit 390. Path 385*c* carries the incremented write pointer value (394*b*) that adds to the base value of the begin pointer 394*a* for identifying the next empty slot location 393*i* in the corresponding virtual FIFO 393 where ingressing data is to be written. In one embodiment, the header re-route mapping tables 381-383 define index values into the FIFO allocation memory 394. Each mapping index value is substitution wise replaced by the absolute value of the current write pointer 394*b* of the corresponding virtual FIFO for use in generating the write address 391 applied to memory unit 390. In an alternate embodiment, the write and read pointers (394*b*, 394*d*) may operate as relative offsets to base begin and/or end of buffer values stored in the FIFO allocation memory 394.

The begin and end pointers (e.g., 394*a*, 394*e*) of the variable-depth virtual FIFO's (e.g., 393, 393*a*, 393*b*) are defined at least during network bring up or reconfiguration, and more specifically after lane aggregation for each port and bifurcation for each channel are negotiated for each physical link (e.g., 311, 31N). As already explained, the Ports Configuration Controller 375 stores the port's aggregation and bifurcation information after network bring-up negotiations complete, and the PCC 375 forwards the resulting link width(s) information via connection 388 to corresponding PFC's 386-387. The resulting link/channel width(s) information 388 is also coupled to the scheduler/dispatch state machines combination 398/399. The scheduler 398 may use the link/channel width(s) information 388 to determine if slack time will be available during the dispatching of primary data blocks to an egress pipe with a downstream discharge rate that is potentially smaller than the data rate of the dispatch bus 397, and if so, how much slack time is available and which other dispatch jobs may be interwoven into the slack time of the primary dispatch job. The PFC's 386-387 (Pointer Flow Control units) may use the link/channel width(s) information 388 to define the corresponding begin and end pointers of their respective elastic FIFO's by way of buffer allocation connections like 387*b*.

Any one of a number of different methods may be used for elastically defining the depths of the virtual FIFO's (e.g., 393*a*, 393*b*) in response to the received link/channel width(s) information 388. Referring to FIG. 3B, in one embodiment 300' each aggregate-able port (e.g., ports Q, R and S) is assigned a memory area like 393.Q, 393.R and 393.S according to the number of lanes aggregated into that port. The assigned memory area is used to establish the port's virtual FIFO's for the port's respective one or more virtual channels. Memory areas 393.Q, 393.R and 393.S may each of the same size in one variation but may be segmented differently based on the negotiated number of channels and channel widths of their respective ports. Memory area 393.S is drawn larger in FIG. 3B so that it can contain the additional textual material provided therein. Memory area 393.S may be of larger, smaller or equal storage capacity to area 393.R depending on how the respective ports are formed of their respective numbers of aggregated lanes. It is assumed in FIG. 3B that port Q has bifurcated into two, relatively wide (relatively high bandwidth) virtual channels in the illustrated example. Memory area 393.Q has accordingly been bifurcated into two relatively long (deep) virtual FIFO's; 393Q.1 and 393Q.2. It is further assumed for sake of example that port R has the same number of lanes aggregated into it as has port Q but that port R bifurcated into four narrower virtual channels (Ch3-Ch6). Corresponding memory area 393.R has accordingly been bifurcated into four shallower virtual FIFO's; 393R.1 through 393R.4. The specific memory area allocated to each port, after lane aggregation and respective channel bifurcation operations complete (or all aggregation and bifurcation operations of the network complete) may be determined by a pre-programmed look-up table (not shown) that assigns different FIFO mappings to various permutations of lane aggregation and channel bifurcation. Users may program such a LUT (not shown) to implement any desired, lookup based assignment of number of virtual FIFO's, FIFO depths and/or block segmentations (e.g., split of block 393.R into four same length FIFO's). The lookup function which determines FIFO depth may be responsive to any one or more variables such as: channel bandwidths (388); predetermined traffic patterns on respective ones of the channels or logical links; special higher priorities given to one or more of the channels or ports and implemented by assigning comparatively greater FIFO depths to the respective FIFO's of that channel or port than to counterpart FIFO's of a lower priority channel or port; and special QOS (quality of service) attributes assigned to one or more of the channels or ports and implemented by assigning comparatively greater FIFO depths to the respective FIFO's of that channel or port than to counterpart FIFO's of a lower priority channel or port. Methods other than table lookup may be used for determining depths of the elastic FIFO's in response to post-negotiation channel bandwidths.

While adjustment of elastic FIFO depths can be one aspect of an embodiment in accordance with the present disclosure, a more important aspect of FIG. 3B deals with utilization of the finite bandwidth of the data egress bus 397' and the finite bandwidth of the data read-out bus 395' of memory unit 390'. (In one embodiment, more than one memory unit feeds into tri-state bus 397' and hence the showing of secondary tri-state driver 395*b*. A plurality of memory units like 390' may drive dispatch bus 397' on a time multiplexed basis.) In the illustrated example, egress bus 397' is 16 bytes wide, meaning that it can output a maximum of 16 bytes of useful data per clock cycle (this referring to rising and/or falling edges of the clock—not shown—used to synchronize transmissions over egress bus 397'). A plurality of tri-state drivers like 395*a* and 395*b* can alternatingly couple data from plural memory output ports (like the data output of 390', not all memory units are shown) onto egress bus 397' so that memory unit speed does not limit the speed of egress bus 397'. However, egress bus 397' has a finite bandwidth nonetheless by virtue of its design-chosen width (16B in this example, but it could have been 8B or 32B for example depending on the maximum lane aggregation number allowed per port in a given system).

In accordance with the present disclosure, it is recognized that the downstream discharge rate of one or more egress channels may be less than the bandwidth (e.g., 16B/cc) of the dispatch bus 397' if those egress channels are assigned relatively small bandwidths (e.g., 1B/cc) during network bring-up or network reconfiguration. It is recognized that the bandwidth of the dispatch bus 397' will be wasted if the scheduler 398" commands only a single dispatch engine (e.g., 399.1) to dispatch 16B data blocks to an egress pipe with a smaller discharge rate (e.g., 1B/cc such as the case with pipe 161 of FIG. 1A). Therefore, in accordance with the disclosure, the scheduler 398" receives link and/or channel widths data from bus 388' and the scheduler 398" uses this data to determine how much slack time, if any, will be present on bus 397' during the dispatching of primary-dispatch-job data blocks. The scheduler 398" knows the timing of the slack time slots on bus 397' and can thus command a second dispatch engine (e.g., 399.2) to fill those otherwise empty slots with secondary-dispatch-job data blocks. If there are yet further empty slots, the scheduler 398" can command a third dispatch engine (e.g., 399.3) to fill those otherwise empty slots with further secondary-dispatch-job data blocks and so on. In the illustrated example, the scheduler 398" sends its commands via a multi-drop bus 398*a*. The dispatch engines (399.1, 399.2, 399.3, etc.) respond by outputting corresponding read address signals out to bus 396" via the read control engine and by outputting corresponding egress routing tags out onto route control bus 364*a*. The route control tags (364*a*) are time delayed relative to their corresponding read address signals (396") so as to account for memory read latency. FIG. 3B shows the route control tags (364*a*) as feeding to an egress demultiplexer 364' (shown in phantom). This demultiplexer 364' is one way to route the 16B data blocks to the correct egress lanes. However, in the embodiment of FIG. 3A, the route control tags (364a) instead feed by way of bus 364b into the respective tag detectors (not all shown) of the respective retry buffers. Each retry buffer reads in its corresponding byte portion of the 16B of data flying by at that moment on 16B wide dispatch bus 397 if the route tag indicates the current dispatch bus data is meant for that lane. Only 4 bits of tag code are sufficient for unicast routing of 16B data to up to 16 ports of 1 byte width apiece. Wider tag code may be used if multicast routing is to be supported where a same dispatch bus character routes simultaneously to two or more ports.

Referring still to FIG. 3B, in one embodiment read control engine 395C passes packet length and/or stream length data 395.4" from the pointers memory 394' to the scheduler 398". The scheduler 398" uses that received data to determine when ongoing ones of a primary dispatch and secondary dispatch jobs are going to complete. The scheduler 398" may use this determination for planning ahead and instantiating next dispatch engines to kick in and fill empty time slots on the dispatch bus 397' with new primary of secondary data blocks as soon as a corresponding ongoing dispatch ends. In this way, the scheduler 398" tries to keep the dispatch bus 397' constantly busy and thus tries to make optimum use of available resources when opportunities for doing so present themselves.

The scheduler/arbiter 398" also performs arbitration among competing packets or streams that wish to egress out through dispatch bus 397'. The egress arbiter 398" sends identifications of its picked winners via the multi-drop bus 398a to respective ones of the D.Eng's 399.1, 399.2, etc., and then lets the respective D.Eng's manage the dispatching of data blocks for the picked primary or secondary winners through the common dispatch bus 397' in a time multiplexed manner.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a further example, it is understood that other arrangements besides just a central scheduler 398" and distributed dispatch engines 399.1-399.3, etc. may be used to for determining how and when to fill in empty slots on the dispatch bus. The process may be managed by dedicated hardware and/or by programmed-in firmware and/or software as may be appropriate. The process may be carried out in reconfigurable network systems other than PCI-Express. The point is to automatically recognize that the discharge rate of an egress pipe with variable discharge rate is less than the dispatch bandwidth and that such a condition creates bandwidth slack in the dispatch pathway. That bandwidth slack may be opportunistically filled with secondary dispatch jobs if there are other egress pipes with discharge rates sufficiently small to fit into the slack gaps of the primary dispatch job.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A method comprising at least the following steps implemented by at least one machine:
   utilizing slack bandwidth on a common dispatch path coupled between an output of memory and primary and secondary egress channels during dispatching of primary job data blocks over the common dispatch path to the primary egress channel that discharges the dispatched data blocks as a sequential data flow, where the primary egress channel is characterized by a variable discharge bandwidth, by:
   (a) first determining if a variably established, first data discharge bandwidth of the primary egress channel is less than a maximum dispatch path bandwidth of the common dispatch path;
   (b) in response to an indication by said first determining (a) that the first data discharge bandwidth is less than the maximum dispatch path bandwidth, second determining if a variably established, second data discharge bandwidth of the secondary egress channel that discharges dispatched secondary data blocks is less than or equal to a first slack difference between the first data discharge bandwidth and the maximum dispatch path bandwidth; and (c) in response to an indication by said second determining (b) that the second data discharge bandwidth is less than or equal to the first slack difference, interlacing dispatchings of the secondary job data blocks with the primary job data blocks over the common dispatch path.

2. The method of claim 1 wherein:
(ab.1) said primary and secondary egress channels pass through respective first and second PCI-Express ports.

3. The method of claim 2 wherein:
(ab.2) said first and second data discharge bandwidths of the primary and secondary egress channels are established during network configuration of a PCI-Express network to which the first and second PCI-Express ports couple.

4. The method of claim 1 and further comprising:
(d) in response to an indication by said second determining (b) that the second data discharge bandwidth is less than the first slack difference, third determining if a variably established, third data discharge bandwidth of a given, other secondary egress channel is less than or equal to a second slack difference between the second data discharge bandwidth and the first slack difference.

5. The method of claim 4 and further comprising:
(e) in response to an indication by said third determining (d) that the third data discharge bandwidth is less than or equal to the second slack difference, interlacing dispatchings over said corresponding dispatch path of other secondary job data blocks to the other secondary egress channel.

6. A data dispatching system that can usefully utilize slack bandwidth on a common dispatch path coupled between an output of memory and primary and secondary egress channels when dispatching primary job data blocks over the common dispatch path to the primary egress channel that discharges the dispatched data blocks as a sequential data flow, where the primary egress channel is characterized by a variable bandwidth, the data dispatching system comprising:

(a) first determining means for determining if a variably established, first data discharge bandwidth of the primary egress channel is less than a maximum dispatch path bandwidth of the common dispatch path;
(b) second determining means coupled to respond to an indication by said first determining means that the first data discharge bandwidth is less than the maximum dispatch path bandwidth, said second determining means being for determining if a variably established, second data discharge bandwidth of the secondary egress channel that discharges dispatched secondary data blocks is less than or equal to a first difference between the first data discharge bandwidth and the maximum dispatch path bandwidth; and
(c) interlacing means that is responsive to an indication by said second determining means that the second data discharge bandwidth is less than or equal to the first difference by interlacing dispatchings of the secondary job data blocks with the primary job data blocks over the common dispatch path.

7. The data dispatching system of claim 6 wherein said primary and secondary egress channels pass through respective first and second PCI-Express ports.

8. A scheduler coupled to orchestrate dispatchings of data blocks over a common dispatch pathway coupled between an output of memory and plural egress pipes comprising first and second egress pipes, the dispatchings of data blocks belonging to one or more data streams that are expected to discharge as continuous flows from respective discharge ends of the plural egress pipes, where data discharge rates of one or more of the plural egress pipes are variable and bandwidth of the common dispatch pathway is pre-established, the scheduler comprising:

(a) first input means for receiving discharge rate data representing respective data discharge rates of the plural egress pipes having variable discharge rates;
(b) first determining means for determining if a first data discharge rate of the first egress pipe designated as a primary egress pipe that discharges dispatched primary data blocks is less than the pre-established bandwidth of the common dispatch pathway;
(c) second determining means for determining if a second data discharge rate of the second egress pipe designated as a secondary egress pipe that discharges dispatched secondary data blocks is less than or equal to a first difference between the first data discharge rate and the pre-established bandwidth; and
(d) interlacing means, responsive to the second determining means, for causing interlacing of dispatchings over the common dispatch pathway of primary and secondary data blocks such that the respective data streams of the primary and secondary egress pipes discharge as continuous flows.

9. The scheduler of claim 8 and further comprising:
(e) second input means for receiving stream length data representing respective remainder lengths of data streams that are flowing out of respective egress pipes or are to flow out of respective egress pipes, where the remainder lengths are indicative of how much of their respective streams are left for dispatch and not yet flowed out;
(f) third determining means, responsive to the received stream length data and to the received discharge rate data, for determining how soon one or more of primary and/or secondary dispatchings will complete; and
(g) fourth determining means for determining how much slack bandwidth will be made available on the common dispatch pathway due to a next completing of dispatchings for one or more of the primary and/or secondary streams whose dispatchings are ongoing.

10. The scheduler of claim 8 and further comprising:
(e) primary designating means for designating as a next primary dispatch job one of an ongoing secondary dispatch job or a to be dispatched job after a current primary dispatch job completes.

11. A packets transfer device that can be embedded within a communications system having a common dispatch pathway coupled between an output of memory and a plurality of configurable communication channels where data transfer rates of said channels are at least one time configurable, the packets transfer device comprising:

(a) the memory comprising a plurality of configurable First-In First-Out buffers (FIFO's) having respectively configurable FIFO depths;
(b) one or more FIFO configuring units that are responsive to channel rate signals indicative of current data transfer rates associated with said plurality of configurable communication channels and that configure a corresponding one or more of the configurable FIFO's to have FIFO depths that are functions of one or more of the channel rate signals; and (c) interlacing means for interlacing dispatchings over the common dispatch pathway of data blocks belonging to a plurality of data streams flowing from said configurable FIFO's to at least two of said plurality of configurable communication channels.

12. The packets transfer device of claim 11 wherein:

(a.1) said configurable FIFO's are defined in a common buffer memory unit having a data input bus coupled to receive data ingress data from plural ones of said configurable communication channels.

13. The packets transfer device of claim 11 wherein:

(b.1) said one or more FIFO configuring units are further responsive to read and write length signals indicative of current amounts of data respectively read into and written out of the configurable FIFO's, said configuring units responsively outputting slack advisement signals indicative of slack space available in the configurable FIFO's.

14. The packets transfer device of claim 11 and further comprising:

(c) a re-programmable pointers memory unit operatively coupled to said FIFO configuring units, the pointers memory unit storing pointer data indicating respective begin addresses of said configurable FIFO's and end addresses or depths of the said configurable FIFO's.

15. The packets transfer device of claim 11 where said device is included in a monolithic integrated circuit.

16. A multi-port switching device having plural, bifurcatable ports, with each port implementing one or more communication traffic lanes after port bifurcation; where at least one virtual First-In First-Out buffer (FIFO) is defined for each lane of each bifurcated port and where depth of the at least one virtual FIFO of each lane is a function of traffic speed associated with the lane after port bifurcation and wherein dispatchings of egress data blocks from said virtual FIFO's to two or more of the bifurcatable ports can be interlaced over a common dispatch bus coupled between said virtual FIFO's and said two or more of the bifurcatable ports.

17. A data dispatch method comprising at least the following steps implemented by at least one machine:

(a) automatically recognizing that a first discharge rate of a first egress pipe with variable discharge rate is less than a common dispatch bandwidth of a common dispatch bus, wherein the common dispatch bus is coupled between an output of memory and a plurality of egress pipes including the first egress pipe, wherein the common dispatch bus dispatches data to the plurality of egress pipes including the first egress pipe and wherein the plurality of egress pipes discharge the dispatched data; and (b) automatically determining whether a bandwidth slack condition created on the common dispatch bus due to the first discharge rate being less than the common dispatch bandwidth can be opportunistically filled with one or more secondary dispatch jobs to at least one of the other plurality of egress pipes while data blocks in a primary dispatch job are dispatched to the first egress pipe.

* * * * *